(12) United States Patent
Hayashi

(10) Patent No.: US 12,236,379 B2
(45) Date of Patent: Feb. 25, 2025

(54) WORKFLOW INFORMATION PROCESSING APPARATUS, WORKFLOW INFORMATION PROCESSING SYSTEM, AND WORKFLOW INFORMATION PROCESSING METHOD

(71) Applicant: Yuuichiroh Hayashi, Kanagawa (JP)

(72) Inventor: Yuuichiroh Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 163 days.

(21) Appl. No.: 17/807,238

(22) Filed: Jun. 16, 2022

(65) Prior Publication Data
US 2023/0010119 A1    Jan. 12, 2023

(30) Foreign Application Priority Data
Jul. 8, 2021  (JP) ................................ 2021-113282

(51) Int. Cl.
| | |
|---|---|
| *G06Q 10/06* | (2023.01) |
| *G06F 3/12* | (2006.01) |
| *G06Q 10/0633* | (2023.01) |
| *H04N 1/00* | (2006.01) |
| *G06F 3/0484* | (2022.01) |

(52) U.S. Cl.
CPC .......... *G06Q 10/0633* (2013.01); *G06F 3/12* (2013.01); *H04N 1/00* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 2001/0035965 A1* | 11/2001 | Blasius .................. | B41F 33/16 |
| | | | 399/9 |
| 2007/0013943 A1* | 1/2007 | Sawayanagi .......... | G06F 3/1285 |
| | | | 358/1.15 |
| 2008/0063423 A1* | 3/2008 | Matoba .................. | G03G 15/50 |
| | | | 399/80 |
| 2013/0003119 A1* | 1/2013 | Yamaguchi ........... | G06F 3/1275 |
| | | | 358/1.15 |
| 2014/0022590 A1* | 1/2014 | Matsuda ............ | H04N 1/00344 |
| | | | 358/1.15 |
| 2016/0259933 A1 | 9/2016 | Sugimura et al. | |
| 2016/0266977 A1* | 9/2016 | Hayashi .............. | G06F 11/1402 |
| 2017/0230526 A1 | 8/2017 | Hayashi et al. | |

(Continued)

FOREIGN PATENT DOCUMENTS

| | | |
|---|---|---|
| JP | 2008-065702 | 3/2008 |
| JP | 2017-142766 | 8/2017 |

*Primary Examiner* — Akwasi M Sarpong
*Assistant Examiner* — Pawan Dhingra
(74) *Attorney, Agent, or Firm* — IPUSA, PLLC

(57) ABSTRACT

An information processing apparatus, an information processing system, and an information processing method. The information processing apparatus transmits input screen information for displaying an input screen for receiving input of a workflow including a plurality of components to a communication terminal communicably connected to the information processing apparatus, sets the workflow including a component whose usage history is to be counted according to an operation on the input screen displayed at the communication terminal based on the input screen information, and in response to an execution of the workflow, counts the usage history of the component to be counted included in the workflow.

10 Claims, 31 Drawing Sheets

(56) References Cited

U.S. PATENT DOCUMENTS

| | | |
|---|---|---|
| 2017/0255486 A1 | 9/2017 | Zhang et al. |
| 2018/0343352 A1 | 11/2018 | Hayashi et al. |
| 2020/0097162 A1 | 3/2020 | Hayashi et al. |
| 2020/0396343 A1 | 12/2020 | Hayashi |
| 2021/0019199 A1 | 1/2021 | Hayashi |
| 2022/0276859 A1* | 9/2022 | Brevoort .................. G06F 8/60 |

* cited by examiner

FIG. 6A

| APPLICATION ID | APPLICATION NAME | COMPONENT ID | APPLICATION PROCESSING INFORMATION |
|---|---|---|---|
| A10000 | WORKFLOW APPLICATION A | CA01(OCR), CB01(FILE UPLOAD) | ... |
| A10001 | WORKFLOW APPLICATION B | CA01(OCR), CT00001(COUNT), CA02(IMAGE CONVERSION), CB01(FILE UPLOAD) | ... |
| A10002 | WORKFLOW APPLICATION C | CA01(OCR), CT00002(COUNT), CB02(EMAIL TRANSMISSION) | ... |
| A10003 | WORKFLOW APPLICATION D | CA01(OCR), CA01(OCR), CB02(EMAIL TRANSMISSION), CT00003(COUNT), CT00004(COUNT) | ... |
| ... | ... | ... | ... |

FIG. 6B

| APPLICATION ID | APPLICATION NAME | COMPONENT ID | APPLICATION PROCESSING INFORMATION |
|---|---|---|---|
| A10000 | WORKFLOW APPLICATION A | CA01(OCR), CB01(FILE UPLOAD) | ... |
| A10001 | WORKFLOW APPLICATION B | CA01(OCR), CONDITION 1, CA02(IMAGE CONVERSION), CB01(FILE UPLOAD) | ... |
| A10002 | WORKFLOW APPLICATION C | CA01(OCR), CONDITION 2, CB02(EMAIL TRANSMISSION) | ... |
| A10003 | WORKFLOW APPLICATION D | CA01(OCR), CONDITION 3, CB02(EMAIL TRANSMISSION), CONDITION 4 | ... |
| ... | ... | ... | ... |

FIG. 7

```
[
    {
        "data_id": 1,
        "data_key": "storage_filename",
        "format": "input_text",
        "data_source": null
    },
    {
        "data_id": 2,
        "data_key": "storage_targetfolder",
        "format": "select",
        "data_source": http://sample.ricoh.xxx/service-a/folders
    }
]
```

FIG. 8

```
[
    {
        "data_id": 1,
        "display_name": "file name",
        "layout": {
            "order": 1
        }
    },
    {
        "data_id": 2,
        "display_name": "destination",
        "layout": {
            "order": 2
        }
    }
]
```

FIG. 9

| APPLICATION ID | COMPONENT ID | SETTINGS INFORMATION |
|---|---|---|
| A10000 | CA01 | { "operation":"ocr", "parameters":{ "language":["Japanese", "Chinese", "Thai"] } } |
| A10001 | CB02 | { "operation":"sendMail", "parameters":["to", "cc"] } |
| ... | ... | ... |

FIG. 10

| CONTRACT ID | TENANT ID | APPLICATION ID | USER ACCOUNT | BILLING CONDITIONS ||||
|---|---|---|---|---|---|---|---|
| | | | | BILLING FREQUENCY | BILLING UNIT | CALCULATION FORMULA ||
| CONTR1001 | TENANT A | A10001 | ABC@mmm.com DEF@mmm.com ... | MONTHLY | BY CONTRACT | JPY30/PROCESSING JPY15/PAGE ||
| CONTR1002 | TENANT B | A10002 | XXX@nnn.com YYY@nnn.com ... | WEEKLY | BY TENANT | JPY9/PAGE ||
| CONTR1003 | TENANT A | A10003 | ... | AT EACH USAGE | BY USER | JPY20/PAGE ||
| ... | ... | ... | ... | ... | ... | ... ||

FIG. 11A

| COUNT SETTING ID | COUNT SETTINGS (CONDITIONAL EXPRESSION) |
|---|---|
| C00001 | ocr_pages |
| C00002 | ocr_pages |
| C00003 | ocr_pages |
| C00004 | ocr_jp_pages |
| C00005 | ocr_pages >= 5 |
| C00006 | executions |
| ... | ... |

FIG. 11B

| CONDITION | COUNT SETTINGS (CONDITIONAL EXPRESSION) |
|---|---|
| 1 | ocr_pages |
| 2 | ocr_pages |
| 3 | ocr_pages |
| 4 | ocr_jp_pages |
| 5 | ocr_pages >= 5 |
| 6 | executions |
| ... | ... |

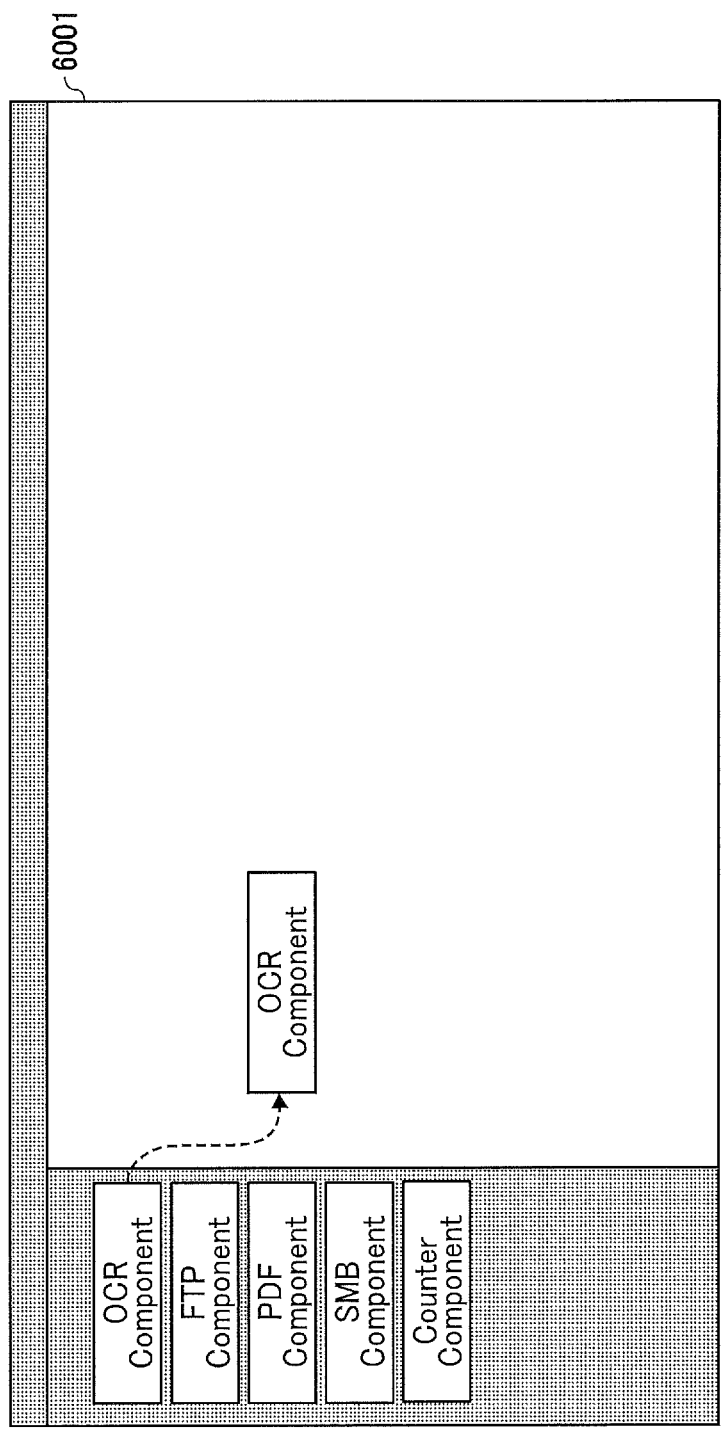

FIG. 16

```
{
    "ocr": [
        "filename": "output.pdf",
        "fileSize": 307200,
        "pages": 5
    ]
}
```

FIG. 22A

| CONTRACT ID | TENANT ID | USER ACCOUNT | COUNT VALUE |
|---|---|---|---|
| CONTR1001 | — | — | 20 |
| — | TENANT A | — | 10 |
| — | — | ABC@mmm.com | 30 |
| ... | ... | ... | ... |

FIG. 22B

| CONTRACT ID | TENANT ID | USER ACCOUNT | KEYWORD | COUNT VALUE |
|---|---|---|---|---|
| CONTR1001 | — | — | ocr_pages | 20 |
| — | TENANT A | — | ocr_pages | 10 |
| — | — | ABC@mmm.com | ocr_pages | 30 |
| CONTR1006 | — | — | executions | 15 |
| ... | ... | ... | ... | ... |

FIG. 24

| APPLICATION ID | APPLICATION NAME | COMPONENT ID | APPLICATION PROCESSING INFORMATION |
|---|---|---|---|
| A10000 | WORKFLOW APPLICATION A | CA01 (OCR), CB01 (FILE UPLOAD) | ... |
| A10001 | WORKFLOW APPLICATION B | CA01 (OCR), CA02 (IMAGE CONVERSION), CB01 (FILE UPLOAD) | ... |
| A10002 | WORKFLOW APPLICATION C | CA01 (OCR), CB02 (EMAIL TRANSMISSION) | ... |
| A10003 | WORKFLOW APPLICATION D | CA01 (OCR), CA01 (OCR), CB02 (EMAIL TRANSMISSION) | ... |
| ... | ... | ... | ... |

FIG. 25

| COMPONENT ID | COUNT SETTINGS |
|---|---|
| CA01 (OCR) | ocr_pages |
| CA02 (IMAGE CONVERSION) | — |
| CB01 (FILE UPLOAD) | — |
| CB02 (EMAIL TRANSMISSION) | ocr_jp_pages |
| ... | ... |

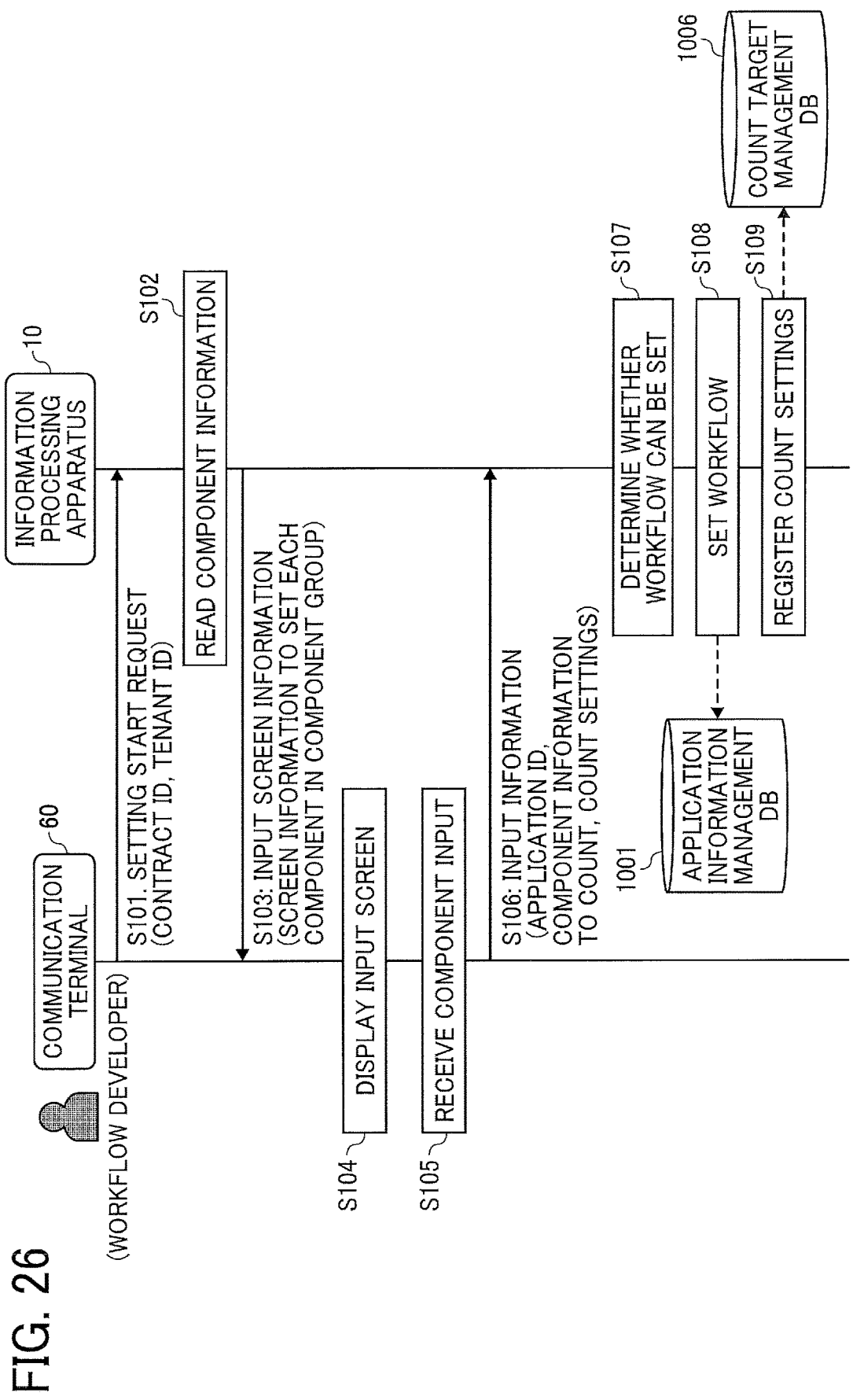

WORKFLOW INFORMATION PROCESSING APPARATUS, WORKFLOW INFORMATION PROCESSING SYSTEM, AND WORKFLOW INFORMATION PROCESSING METHOD

CROSS-REFERENCE TO RELATED APPLICATIONS

This patent application is based on and claims priority pursuant to 35 U.S.C. § 119(a) to Japanese Patent Application No. 2021-113282, filed on Jul. 8, 2021, in the Japan Patent Office, the entire disclosure of which is hereby incorporated by reference herein.

BACKGROUND

Technical Field

The present disclosure relates to an information processing apparatus, an information processing system, and an information processing method.

Related Art

In recent years, services that combine a plurality of functions (for example, scan, print, email transmission, etc.) have become known. For example, a service in which an electronic file (image file) generated by scanning is processed in a certain way and then delivered by an email is known. Such service is provided by executing one or more processes that implement each function as a series of processes.

SUMMARY

Embodiments of the present disclosure describe an information processing apparatus, an information processing system, and an information processing method. The information processing apparatus transmits input screen information for displaying an input screen for receiving input of a workflow including a plurality of components to a communication terminal communicably connected to the information processing apparatus, sets the workflow including a component whose usage history is to be counted according to an operation on the input screen displayed at the communication terminal based on the input screen information, and in response to an execution of the workflow, counts the usage history of the component to be counted included in the workflow.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6A is a table illustrating an example of an application information management table;

FIG. 6B is a table illustrating another example of the application information management table;

FIG. 7 is a conceptual diagram illustrating an example of a data definition;

FIG. 8 is a conceptual diagram illustrating an example of layout information;

FIG. 9 is a table illustrating an example of an application settings management table;

FIG. 10 is a table illustrating an example of a billing conditions management table;

FIG. 11A is a table illustrating an example of a count settings management table;

FIG. 11B is a table illustrating another example of the count settings management table;

FIGS. 15A, 15B, 15C, and 15D are diagrams illustrating an example of screen transition of a workflow input screen displayed on the communication terminal;

FIG. 16 is a conceptual diagram illustrating an example of output data after executing an optical character recognition (OCR) process;

FIG. 22A is a table illustrating an example of a count value management table;

FIG. 22B is a table illustrating another example of the count value management table;

FIG. 24 is a table illustrating another example of the application information management table;

FIG. 25 is a table illustrating an example of the count target management table;

FIG. 26 is a sequence diagram illustrating another example of the workflow setting process initiated by a workflow developer.

Figure 1:
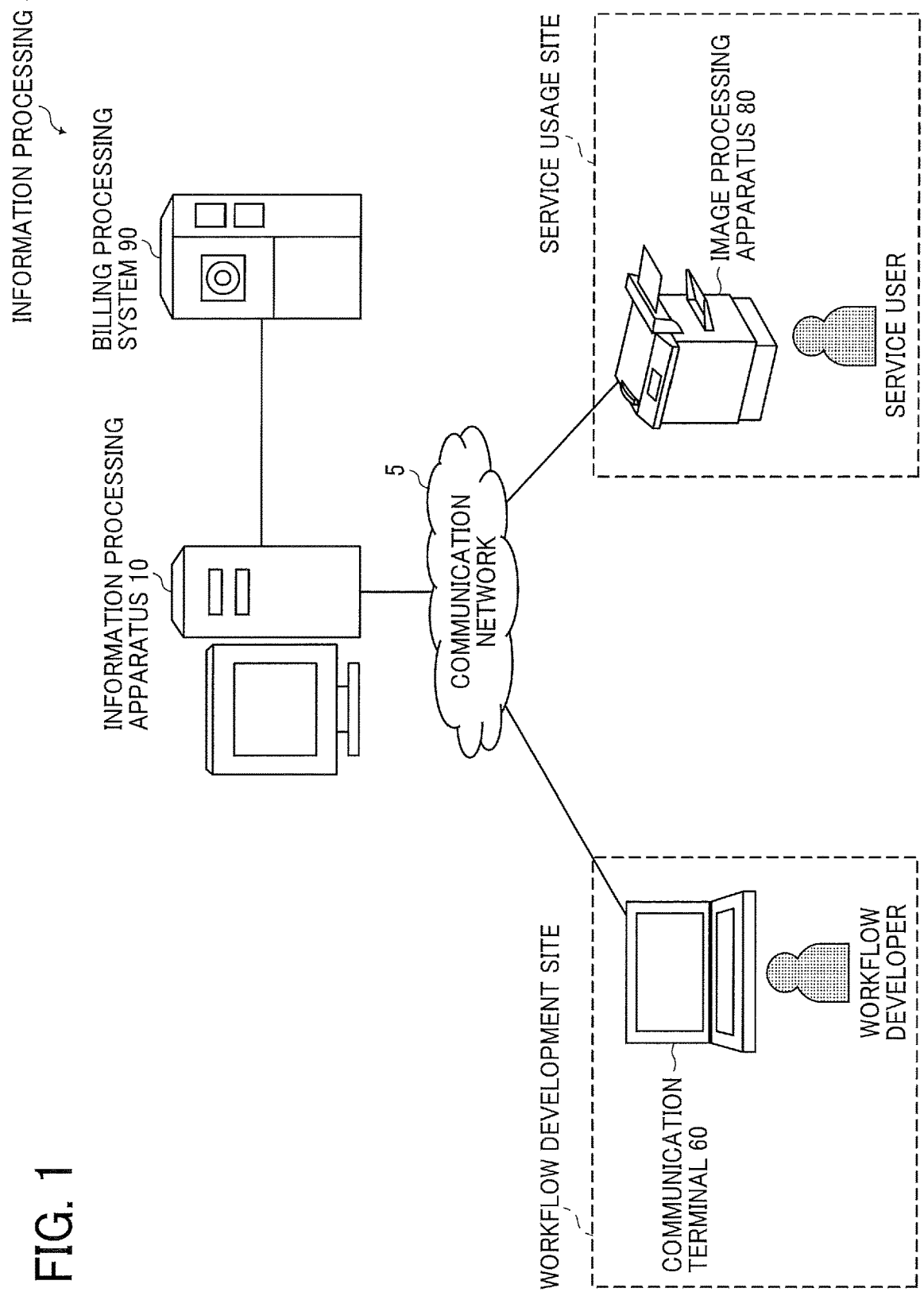
FIG. 1 is a diagram illustrating an example of an overall configuration of an information processing system.

The accompanying drawings are intended to depict embodiments of the present invention and should not be interpreted to limit the scope thereof. The accompanying drawings are not to be considered as drawn to scale unless

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present disclosure are described with reference to the drawings. In the description of the drawings, the same elements are denoted by the same reference numerals, and redundant descriptions thereof are omitted.

FIG. 1 is a diagram illustrating an example of an overall configuration of an information processing system. In the information processing system 1 illustrated in FIG. 1, a workflow developer creates or updates an application that executes a service provided by an information processing apparatus 10.

The information processing system 1 includes the information processing apparatus 10, a communication terminal 60, an image processing apparatus 80, and a billing processing system 90. The information processing apparatus 10, the communication terminal 60, the image processing apparatus 80, and the billing processing system 90 included in the information processing system 1 communicate with each other through a communication network 5. The communication network 5 is implemented by the internet, a mobile communication network, a local area network (LAN), etc. The examples of the communication network 5 include in addition to wired communication, wireless communication networks such as 3rd Generation (3G), 4th Generation (4G), 5th Generation (5G), WIRELESS FIDELITY (Wi-Fi, a registered trademark), Worldwide Interoperability for Microwave Access (WiMAX), and Long Term Evolution (LTE). Further, the information processing apparatus 10, the communication terminal 60, and the image processing apparatus 80 may be provided with a communication function by a short-range communication technology such as Near Field Communication (NFC). The information processing system 1 may provide a firewall between each apparatus and each terminal connected to the communication network 5 and implement a private network such as the LAN inside the firewall.

The information processing apparatus 10 provides various services through the communication network 5. The information processing apparatus 10 provides, for example, a billing service in which an electronic file generated by scanning a document by the image processing apparatus 80 of a service usage site is processed by OCR and usage information is transmitted to the billing processing system 90. Further, the information processing apparatus 10 provides, for example, a service (cloud print service) for printing an electronic file stored in a cloud system that provides a specific service with an image processing apparatus 80 at a service usage site.

The services provided by the information processing apparatus 10 are not limited to the services described above. For example, a service that projects an electronic file stored in the cloud system that provides a specific service with a projector installed in the service usage site or a service that translates an electronic file generated by scanning a document by the image processing apparatus 80 into a specific language (for example, from English to Japanese) after OCR processing and saves the electronic file in the cloud system that provides a specific service may be included. Further, in the present embodiment, the information processing apparatus 10 provides the cloud service as described above, but the information processing apparatus 10 may provide, for example, a service or a web service provided by an application service provider (ASP), and various services may be provided through the communication network 5.

Further, the information processing apparatus 10 includes a workflow application that provides various services implemented by a series of processes in which one or more of a plurality of processes that implements various functions are combined. Here, the function is a function related to an electronic file such as a document file or an image file. Functions include, for example, printing, scanning, facsimile transmission, data format conversion, email delivery, OCR processing, file processing, compression, decompression, or storage in a repository.

Figure 2:
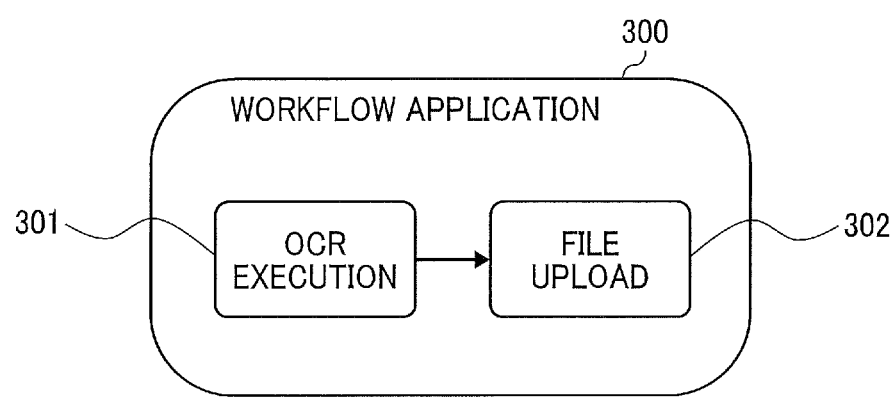
FIG. 2 is a diagram illustrating an example of a workflow application.

An outline of the workflow application is described with reference to FIG. 2. FIG. 2 is a diagram illustrating an example of the workflow application. The workflow application (workflow) is, for example, an application configured by combining a plurality of components (functions) to provide service according to the workflow desired by a user. Some workflow applications may not be made of in-house components, but may also be developed in combination with components produced by a third party such as a development partner. Accordingly, even in one application, set values (specifications) between individual components included in the application may not match. Therefore, in order to manage the workflow application, the set value for each component included in the application is to be clarified.

The workflow application 300 illustrated in FIG. 2 includes a combination of an OCR processing component 301 and a file upload component 302. The number of components included in the workflow application 300 is not limited to two and may be appropriately set according to the workflow desired by the user. Hereinafter, the workflow application in the present embodiment is referred to as an application.

Returning to FIG. 1, the billing processing system 90 is, for example, an external system that manages subscriptions of various executed applications. Specifically, the billing processing system 90 counts usage history (log information including the number of times of processing and the usage amount) of each component included in a specific application executed by the image processing apparatus 80 and performs billing corresponding to the usage history. The billing processing system 90 stores (uploads), for example, the number of pages of an OCR-processed electronic file as a count value (usage amount) in a storage area rented by the billing processing system 90 in a scan distribution service.

The information processing apparatus 10 and the billing processing system 90 may be implemented by a single computer, or may be implemented by a plurality of computers each computer being assigned with each unit (function) of each device. Alternatively, the information processing apparatus 10 and the billing processing system 90 may be, for example, a single computer in which all or a part of the functions are integrated. Further, all or a part of the functions of the information processing apparatus 10 may be a server computer residing in a cloud environment or a server computer residing in an on-premises environment.

The communication terminal 60 is a computer such as a personal computer (PC) used by the workflow developer who develops the application for providing a service by the information processing apparatus 10. The workflow developer develops the application by using an application development tool provided by the information processing apparatus 10 at the workflow development site. The application development tool is software for developing the workflow application. The application development tool enables to select a function from a plurality of functions and register and execute a series of processes connecting the functions as a workflow. As a result, the workflow developer implements a desired operation by combining the plurality of functions using the application development tool and selecting parameters of settings associated with the functions. The communication terminal 60 is not limited to the PC, and may be, for example, a terminal such as a tablet terminal, a smartphone, or a wearable terminal. Further, the communication terminal 60 may be used for a system developer of the information processing system 1 to develop a system in addition to the workflow developer described above for developing the application.

The image processing apparatus 80 is used by a service user who uses the service provided by the information processing apparatus 10. The image processing apparatus 80 is, for example, an image forming apparatus including a communication function and an image processing function such as a multifunction peripheral (MFP), a facsimile, a scanner, or a printer. The service user performs processing related to the service provided by the information processing apparatus 10 using the image processing apparatus 80 in the service usage site.

The devices installed in the service usage site are not limited to the image processing apparatus 80, and may include a projector (PJ), an interactive whiteboard (IWB: whiteboard including an electronic whiteboard function capable of mutual communication), the PC, an industrial machine such as a machine tool, a medical device, a three dimensional (3D) printer or an imaging device, an air conditioning system, an autonomous traveling robot, or the like. Further, in addition to the devices installed at a specific place in the service usage site, the image processing apparatus 80 may be a portable handy printer, a handy scanner, or the like.

Further, when the information processing apparatus 10 transmits data (information) to the communication terminal 60, the information processing apparatus 10 may notify the communication terminal 60 by push notification (transmission). The information processing apparatus 10 may perform push notification using, for example, Firebase Cloud Messaging (FCM), which is an example of the push notification server.

Figure 3:
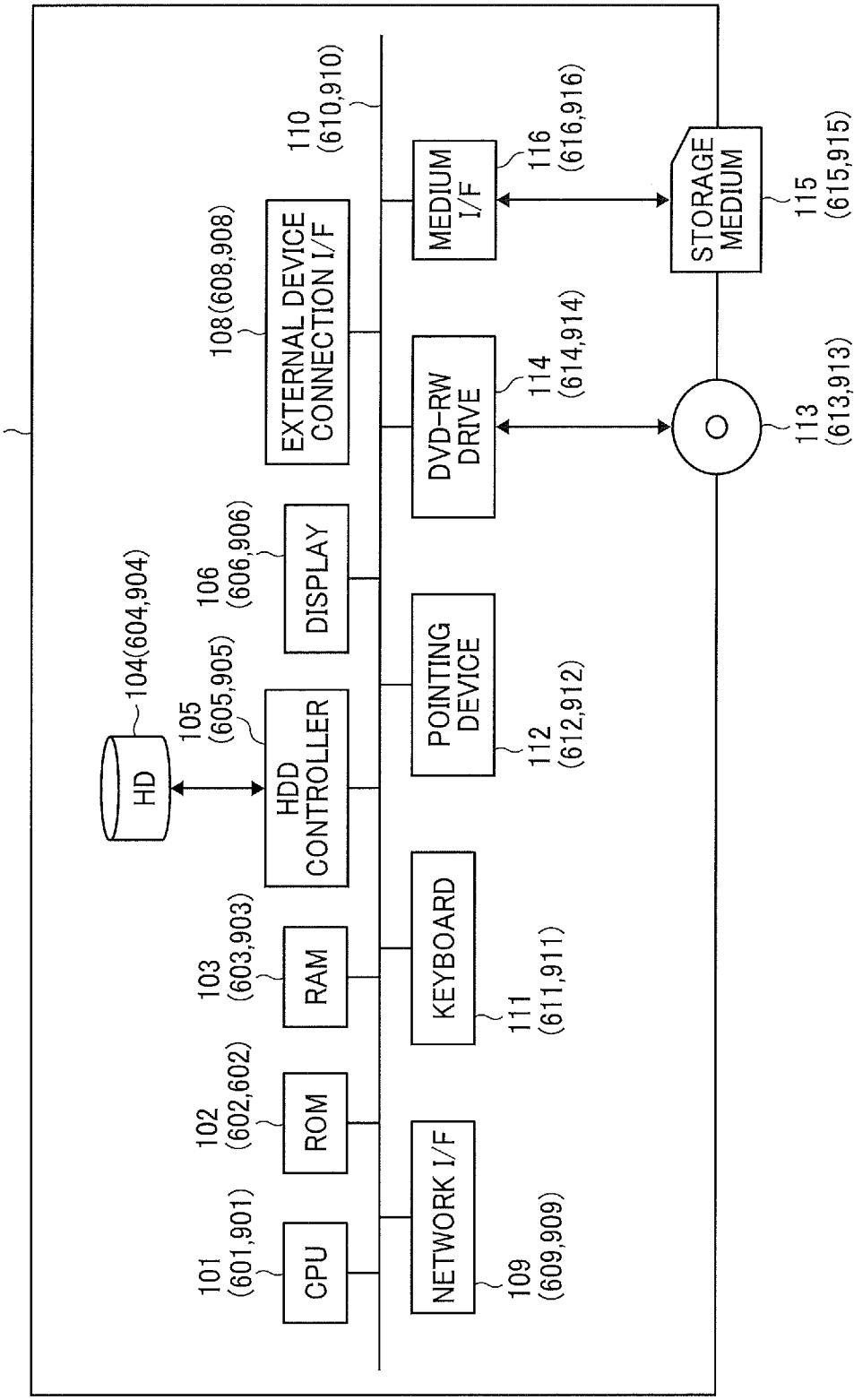
FIG. 3 is a block diagram illustrating an example of a hardware configuration of an information processing apparatus, a communication terminal, and a billing processing system.
Figure 4:
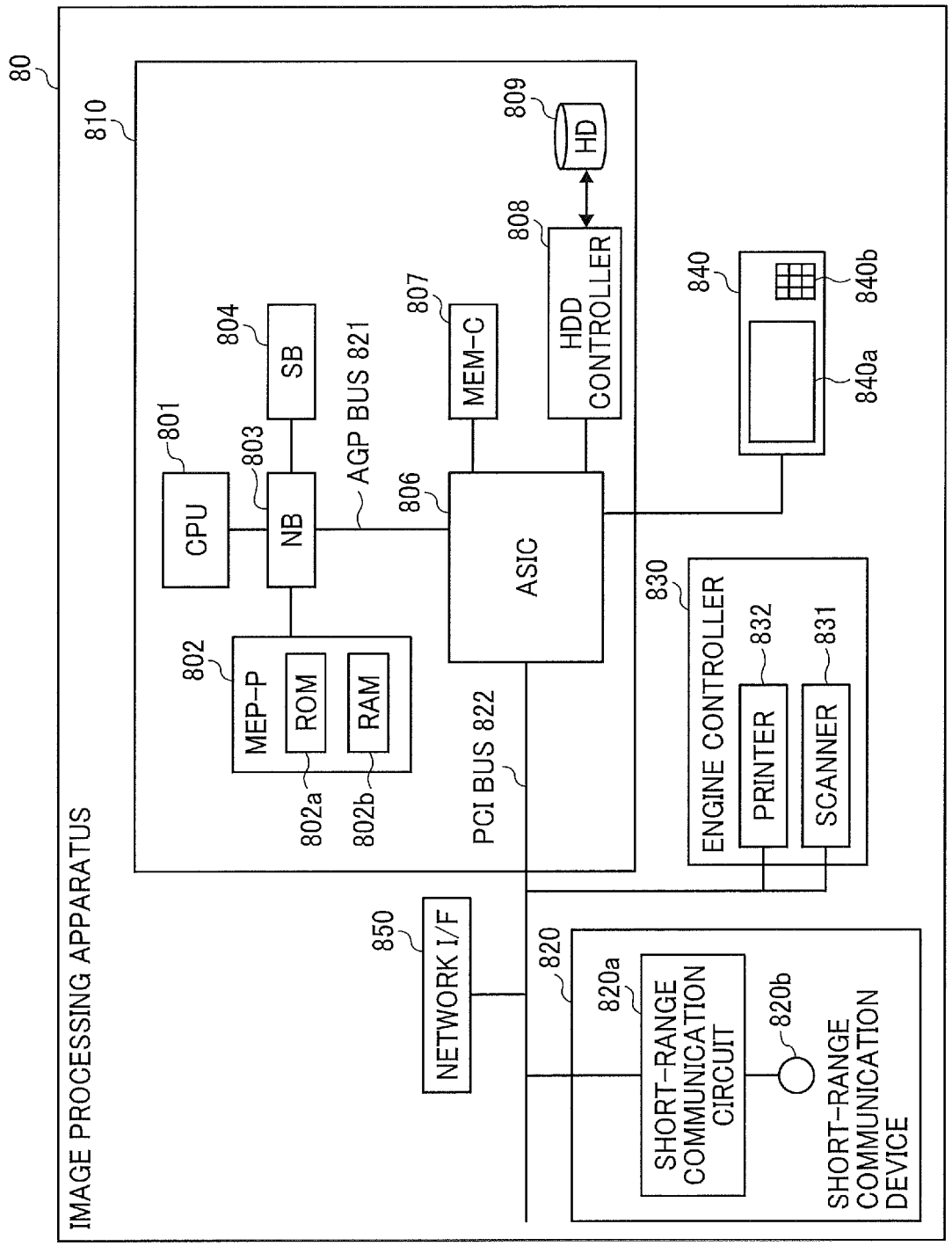
FIG. 4 is a block diagram illustrating an example of a hardware configuration of an image processing apparatus.

With reference to FIGS. 3 and 4, a hardware configuration of the apparatus or the terminal included in the information processing system according to the present embodiment is described. In the hardware configuration of the apparatus or terminal illustrated in FIGS. 3 and 4, components may be added or deleted as appropriate.

FIG. 3 is a diagram illustrating an example of the hardware configuration of the information processing apparatus. Each hardware configuration of the information processing apparatus 10 is indicated by a code in the 100 series. The information processing apparatus 10 is implemented by a computer, and as illustrated in FIG. 3, includes a central processing unit (CPU) 101, a read only memory (ROM) 102, a random access memory (RAM) 103, a hard disk (HD) 104, a hard disk drive (HDD) controller 105, a display 106, an external device connection interface (I/F) 108, a network I/F 109, a bus line 110, a keyboard 111, a pointing device 112, a digital versatile disc rewritable (DVD-RW) drive 114 and a medium I/F 116.

Among these elements, the CPU 101 controls all operations of the information processing apparatus 10. The ROM 102 stores a program used for executing the CPU 101, such as an initial program loader (IPL). The RAM 103 is used as a work area of the CPU 101. The HD 104 stores various data such as a control program. The HDD controller 105 controls reading or writing of various data to the HD 104 according to the control of the CPU 101.

The display 106 displays various information such as cursors, menus, windows, characters, or images. The display 106 is an example of a display. In one example, the display 106 is a touch panel display provided with an input device. The external device connection I/F 108 is an interface for connecting the computer to various external devices. The external device in this case is, for example, a Universal Serial Bus (USB) memory or a printer. The network I/F 109 is an interface for controlling communication of data through the communication network 5. The bus line 110 is an address bus, a data bus, or the like for electrically connecting each component such as the CPU 101 illustrated in FIG. 3.

The keyboard 111 is one example of an input device provided with a plurality of keys for enabling a user to input characters, numerals, or various instructions. The pointing device 112 is another example of the input device that allows a user to select or execute a specific instruction, select a target for processing, or move a cursor being displayed. The input device is not limited to the keyboard 111 and the pointing device 112, and may be a touch panel, a voice input device, or the like. The DVD-RW drive 114 controls reading or writing of various data to the DVD-RW 113 as an example of a detachable recording medium.

The removable recording medium is not limited to the DVD-RW and may be a digital versatile disc recordable (DVD-R) or BLU-RAY DISC (registered trademark), or the like. The medium I/F 116 reads or writes (stores) data from or to a storage medium 115 such as a flash memory.

FIG. 3 is a block diagram illustrating an example of a hardware configuration of the communication terminal. Each hardware configuration of the communication terminal 60 is indicated by a code in the 600 series in parentheses. Since the communication terminal 60 is implemented by the computer and have the same configuration as the information processing apparatus 10 as illustrated in FIG. 3, the description of each hardware configuration is omitted.

FIG. 3 is a diagram illustrating an example of a hardware configuration of the billing processing system. Each hardware configuration of the billing processing system 90 is indicated by a code in the 900 series in parentheses. Since the billing processing system 90 is implemented by the computer and have the same configuration as the information processing apparatus 10 as illustrated in FIG. 3, the description of each hardware configuration is omitted.

FIG. 4 is a block diagram illustrating an example of a hardware configuration of the image processing apparatus. As illustrated in FIG. 4, the image processing apparatus 80 includes a controller 810, a short-range communication device 820, an engine controller 830, a control panel 840, and a network I/F 850. The controller 810 includes a CPU

801 which is a main part of the computer, a system memory (MEM-P) 802, a north bridge (NB) 803, a south bridge (SB) 804, an application specific integrated circuit (ASIC) 806, a local memory (MEM-C) 807 as a storage unit, an HDD controller 808, and an HD 809 as a storage unit. In the controller 810, the NB 803 and the ASIC 806 are connected by an Accelerated Graphics Port (AGP) bus 821.

The CPU 801 is a control unit that controls the entire image processing apparatus 80. The NB 803 is a bridge for connecting the CPU 801 and the MEM-P 802, SB 804, and the AGP bus 821. The NB 803 has a memory controller that controls reading from and writing to the MEM-P 802, a Peripheral Component Interconnect (PCI) master, and an AGP target. The MEM-P 802 includes a ROM 802a which is a memory for storing programs and data that implements each function of the controller 810, and a RAM 802b which is used as a memory for developing programs and data and a memory for drawing in memory printing. The SB 804 is a bridge for connecting the NB 803 and the PCI bus 822 to peripheral devices. The ASIC 806 is dedicated to image processing that includes hardware elements for image processing. The ASIC 806 serves as a bridge connecting the AGP bus 821, the PCI bus 822, the HDD controller 808, and the MEM-C 807, respectively. The ASIC 806 includes a PCI target and an AGP master, an arbiter (ARB) which is the core of the ASIC 806, a memory controller that controls the MEM-C 807, and a plurality of direct memory access controllers (DMACs) that rotate image data by hardware logic and the like, and a PCI unit that transfers data between a scanner 831 and a printer 832 through the PCI bus 822. The ASIC 806 may be connected to a USB interface or an Institute of Electrical and Electronics Engineers 1394 (IEEE1394) interface.

The MEM-C 807 is a local memory used as a copy image buffer and a code buffer. The HD 809 is a storage for accumulating image data, accumulating font data used in printing, and accumulating forms. The HDD controller 808 controls reading or writing of data from and to the HD 809 according to the control of the CPU 801.

The AGP bus 821 is a bus interface for a graphics accelerator card, which has been proposed to accelerate graphics processing. Through directly accessing the MEM-P 802 by high-throughput, speed of the graphics accelerator card is improved. Further, the short-range communication device 820 includes a short-range communication circuit 820a and an antenna 820b of the short-range communication circuit 820a. The short-range communication circuit 820a is a communication circuit for short-range wireless communication such as Near Field Communication (NFC), BLU-ETOOTH (registered trademark), millimeter wave wireless communication, QUICK RESPONSE (QR) code (registered trademark), visible light, environmental sound, or ultrasonic wave.

The engine controller 830 includes a scanner 831 and a printer 832. The scanner 831 and the printer 832 include an image processing function such as error diffusion or gamma conversion. The control panel 840 displays a current set value, selection screen, or the like and includes a display panel 840a such as a touch panel that receives input from the operator, and an operation panel 840b including a numeric keypad for receiving set values of conditions related to image formation such as density settings conditions and a start key for receiving copy start instructions. The controller 810 controls the entire image processing apparatus 80, and controls, for example, rendering, communication, input from the control panel 840, and the like. The network I/F 850 is an interface that controls communication of data through the communication network 5. The short-range communication circuit 820a and the network I/F 850 are electrically connected to the ASIC 806 through the PCI bus 822.

Any one of the above-described programs may be recorded in a file in a format installable or executable on a computer-readable storage medium for distribution. Examples of the storage medium include, but not limited to a Compact Disc Recordable (CD-R), Digital Versatile Disk (DVD), BLU-RAY (registered trademark) disc, secure digital (SD) card, USB memory, and the like. In addition, such storage medium may be provided in a form of a program product to users within a certain country or outside that country. For example, the information processing apparatus 10 implements the remote management method according to the present disclosure by executing the program according to the present disclosure.

Figure 5:
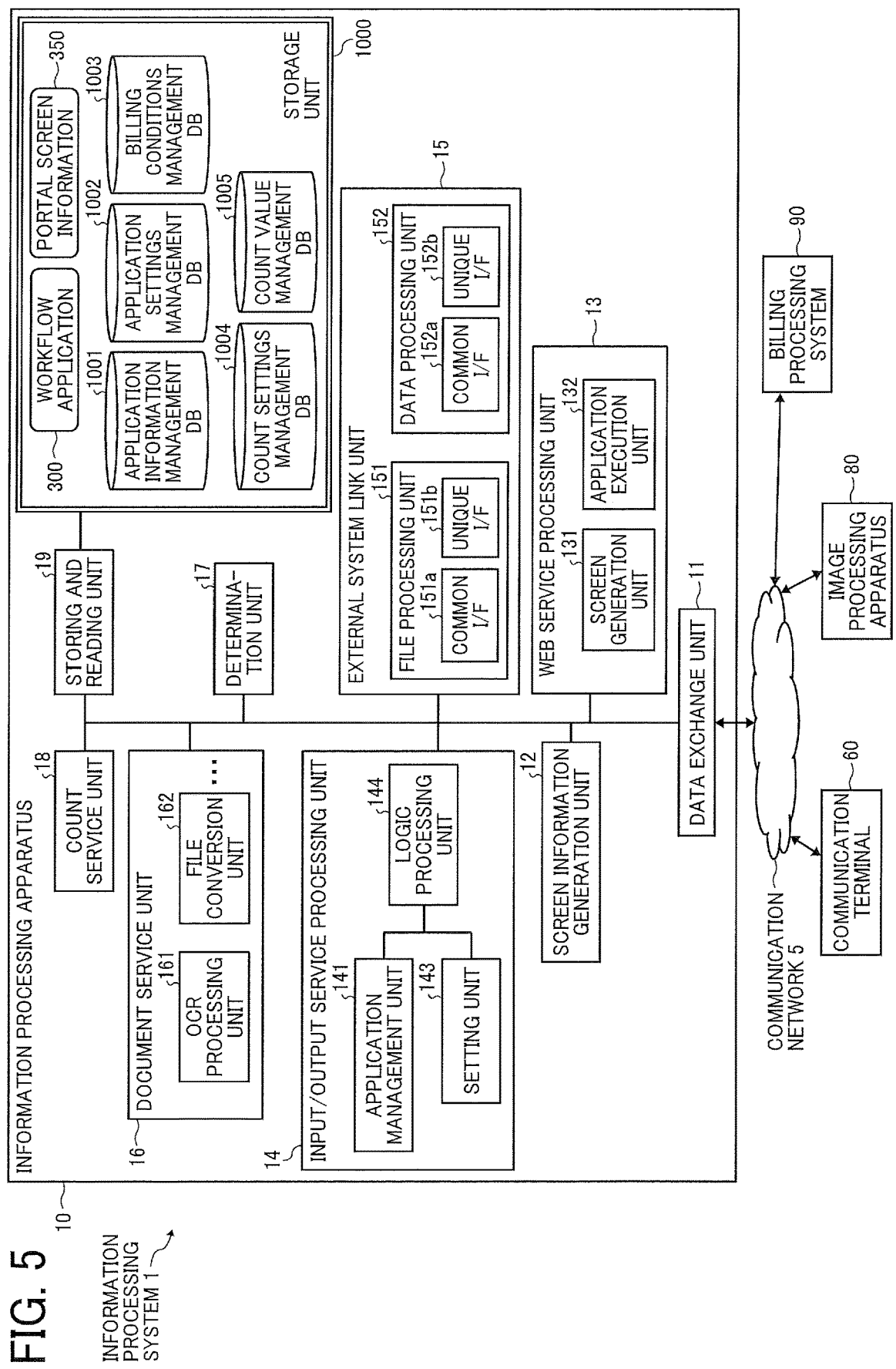
FIG. 5 is a block diagram illustrating an example of a functional configuration of the information processing system.
Figure 12:
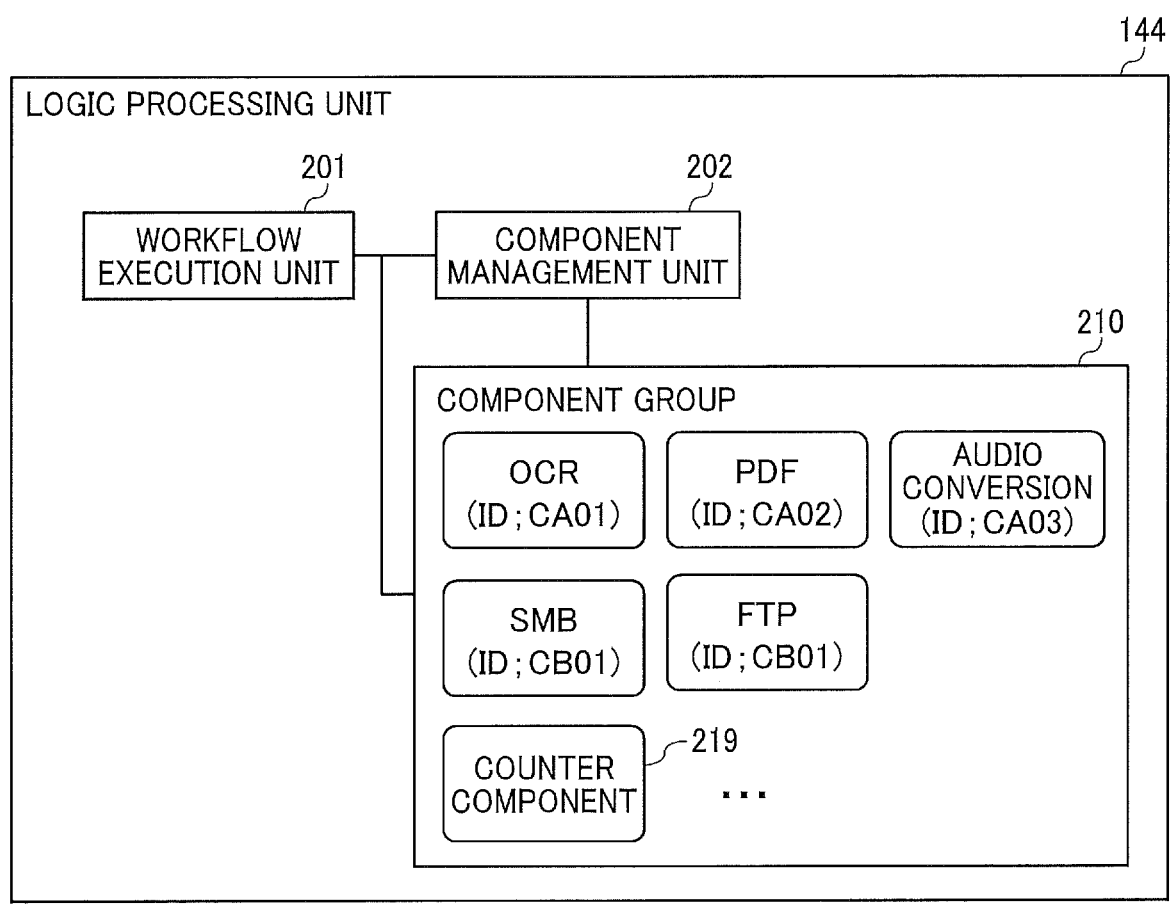
FIG. 12 is a block diagram illustrating an example of a detailed configuration of a logic processing unit.
Figure 13:
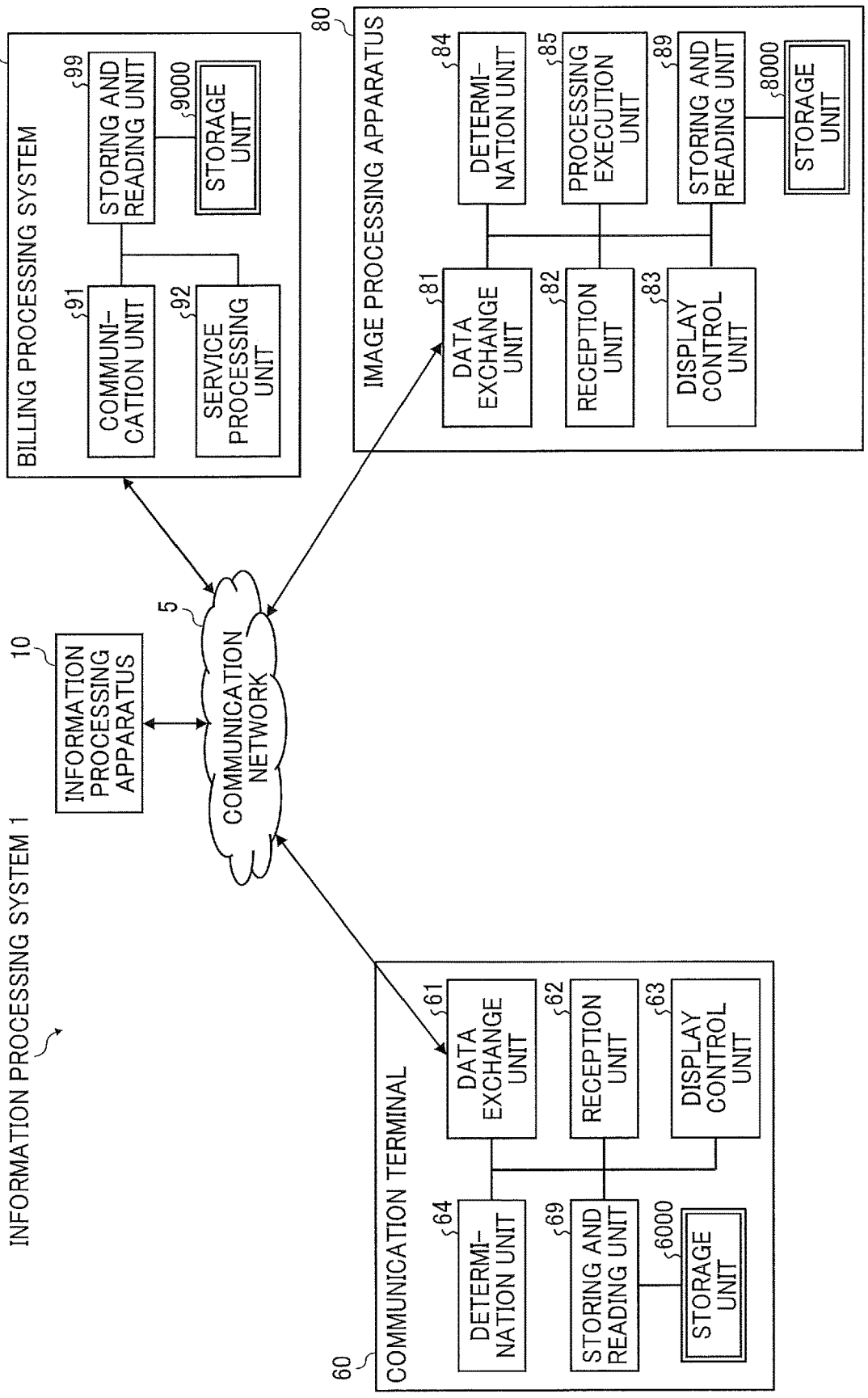
FIG. 13 is a block diagram illustrating an example of a functional configuration of the image processing apparatus, the communication terminal, and the billing processing system.

With reference to FIGS. 5 to 13, a functional configuration of the information processing system according to the present embodiment is described. Note that FIGS. 5, 12 and 13 illustrates the apparatuses or terminals illustrated in FIG. 1 that are related to the processing or operation described below.

FIG. 5 is a diagram illustrating an example of the functional configuration of the information processing apparatus. The information processing apparatus 10 includes a data exchange unit 11, a screen information generation unit 12, a web service processing unit 13, an input/output service processing unit 14, an external system link unit 15, a document service unit 16, a determination unit 17, a count service unit 18, and a storing and reading unit 19. Each of these units includes a function or functions implemented by operating any of the components illustrated in FIG. 3 by an instruction from the CPU 101 according to the information processing apparatus program developed on the RAM 103. Further, the information processing apparatus 10 includes a storage unit 1000 implemented by at least one hardware resource among the ROM 102, the HD 104 and the storage medium 115 illustrated in FIG. 3.

The data exchange unit 11 is implemented mainly by processing of the CPU 101 and the network I/F 109, and exchanges various data or information to and from the communication terminal 60, the image processing apparatus 80, and a billing processing system 90 capable of communicating with the information processing apparatus 10 through the communication network 5. For example, the data exchange unit 11 transmits input screen information of an input screen for inputting a workflow including a plurality of components to a communication terminal 60 capable of communicating with the information processing apparatus 10. Further, the data exchange unit 11 transmits the usage history counted according to the time set for each tenant to the billing processing system 90 that performs billing process based on the usage history.

The screen information generation unit 12 is mainly implemented by the processing of the CPU 101 and generates screen information for the workflow developer to set the workflow using the communication terminal 60.

The screen information generation unit 12 outputs portal screen information 350 stored in the storage unit 1000 in response to a request from the communication terminal 60. Here, the portal is a website on which an application can be registered by using a browser. The portal screen information 350 is information in which various screens such as a portal top screen or an application input screen are defined. The portal screen information 350 is information in which various screens are defined in, for example, HyperText Markup Language (HTML), Extensible HyperText Markup Language (XHTML), Cascading Style Sheets (CSS), JAVASCRIPT (registered trademark), or the like. As a result, the communication terminal 60 displays the portal top screen, the application input screen, or the like by using the browser. Accordingly, the workflow developer using the communication terminal 60 can perform the registration operation of the application (application information) on the input screen of the application (for example, the workflow input screen described later).

The web service processing unit 13 is implemented mainly by the processing of the CPU 101 and performs processing for the user to use various services by using the image processing apparatus 80. In other words, the web service processing unit 13 functions as an application server that provides a web application (application information) to the browser of the image processing apparatus 80. The web service processing unit 13 includes a screen generation unit 131 and an application execution unit 132.

The screen generation unit 131 outputs application screen information stored in the storage unit 1000 and application settings information stored in the storage unit 1000 in response to a request from the browser of the image processing apparatus 80. The application screen information defines a template of a screen (application screen) for using the service provided by the application information. The application screen information is information in which a template of the application screen is defined in, for example, HTML, XHTML, CSS, JAVASCRIPT, or the like. The application settings information defines various settings of the application (application information). The application settings information defines, for example, parameters input by the user, parameters set by default, and the like, among the parameters used for executing a series of processes. Further, the application settings information defines, for example, input items for the user to input parameters on the application screen, display information on the application screen (for example, application name), and the like. The settings information is, for example, information in which various application settings are defined in JavaScript Object Notation (JSON) or the like. The image processing apparatus 80 displays the application screen for using the service provided by the information processing apparatus 10 by the browser based on the settings information.

The application execution unit 132 outputs an application (application information) execution request to the input/output service processing unit 14 in response to a request from the browser of the image processing apparatus 80.

The input/output service processing unit 14 is implemented mainly by the processing of the CPU 101, and performs processing related to the service provided by the information processing apparatus 10. The input/output service processing unit 14 includes an application management unit 141, a setting unit 143, and a logic processing unit 144.

The application management unit 141 manages the application information stored in an application information management database (DB) 1001 described below. The application information is an application for using a service implemented by a series of processes. In other words, the various services provided by the information processing apparatus 10 are provided by the application information. Further, the application management unit 141 outputs processing flow information included in the application information in response to a request from the logic processing unit 144. The processing flow information defines a series of processes that implements the service provided by the application information.

Further, the application management unit 141 stores (registers) the application information in the storage unit 1000 in response to a request from the screen information generation unit 12. As a result, the application information for providing the service is registered in the information processing apparatus 10 by the application management unit 141.

The setting unit 143 sets (generates) a workflow including components whose usage history is to be counted, a count condition, and a predetermined description, based on the input information input by the workflow developer or the like on the communication terminal 60 or the operation on the predetermined screen displayed on the communication terminal 60.

The logic processing unit 144 executes processing of various services such as a document service or an external service based on the processing flow information included in the application information in response to a request from the web service processing unit 13. The logic processing unit 144 executes a series of processing (processing flow) for implementing the service provided by the application based on the processing flow information acquired from the application management unit 141. As a result, the information processing apparatus 10 provides various services such as a file upload service. Further, the logic processing unit 144 also includes a function of reading and acquiring each component included in the component group 210 managed in the logic processing unit 144.

The external system link unit 15 is implemented mainly by the processing of the CPU 101, and performs processing related to file input and output, data acquisition or writing, etc. to the billing processing system 90, external services, and the like. The information processing apparatus 10 includes an external system link unit 15 corresponding to each billing processing system 90 that performs processing in cooperation with the information processing apparatus 10.

The external system link unit 15 includes a file processing unit 151 and a data processing unit 152.

The file processing unit 151 performs file related processing (for example, file transmission or file acquisition) with respect to the billing processing system 90. The data processing unit 152 performs data processing expressed by text other than the file with respect to the billing processing system 90, for example, acquisition of a folder list and the like.

The file processing unit 151 includes a common I/F 151a in which an application programming interface (API) for performing an operation (for example, acquisition, saving, editing, etc.) on the usage history and the electronic file stored in the billing processing system 90 is defined and a unique I/F 151b. The common I/F 151a is, for example, an API commonly used among a plurality of bill processing systems 90 and an API group for using functions related to file operations (for example, acquisition or storage of files, etc.), used by all billing processing systems 90. On the other hand, the unique I/F 151b is, for example, an API used for a specific billing processing system 90 and an API group for using a function related to file operations (for example, adding a file to a document) used for a specific billing processing system 90. Accordingly, the common I/F 151a is similarly defined for all external system link units 15. On the other hand, the unique I/F 151b is defined for the external system link unit 15 corresponding to the specific billing processing system 90 in which the API defined by the unique I/F 151b is used.

The data processing unit 152 includes a common I/F 152a in which an API for acquiring metadata such as bibliographic information of an electronic file (for example, a file list or a folder list, etc.) stored in the billing processing system 90 is defined and a unique I/F 152b. The common I/F 152a is an API commonly used among a plurality of billing processing systems 90 and an API group for using a function related to metadata acquisition (for example, acquisition of a file list or acquisition of a folder list) used in all billing processing systems 90. On the other hand, the unique I/F 152b is an API used in a specific billing processing system 90 and an API group for using a function related to metadata acquisition or the like (for example, acquisition of a list of image files or acquisition of a list of customer information) used in a specific billing processing system 90. Accordingly, the common I/F 152a is similarly defined for all external system link units 15. On the other hand, the unique I/F 152b is defined for the external system link unit 15 corresponding to the specific billing processing system 90 for which the API defined by the unique I/F 152b is available.

As described above, to execute a simple process such as transmitting a file, the external system link unit 15 uses the common I/F to implement the same method for various linked services. In addition, the external system link unit 15 implements processing specialized for a partner service by widely utilizing the functions of the specific partner service using the unique I/F. The external system link unit 15 may transmit (register) the count value (usage amount) to the billing processing system 90 described below, instead of the count service unit 18. The external system link unit 15 may transmit the count value (usage amount) to the billing processing system 90 through an interface that implements direct connection instead of transmitting to the communication network 5 through the data exchange unit 11.

The document service unit 16 is implemented mainly by the processing of the CPU 101 and executes a predetermined process included in a series of processes (process flow) based on the process flow information. The document service unit 16 includes an OCR processing unit 161 and a file conversion unit 162.

The OCR processing unit 161 is mainly implemented by the processing of the CPU 101, and performs the OCR processing on the electronic file. The file conversion unit 162 performs format conversion, image size conversion, and the like for the electronic file. In addition to the OCR processing unit 161 and file conversion unit 162, the document service unit 16 may include various functional units such as a compression/decompression processing unit for compressing or decompressing the electronic file, or an email transmission unit for transmitting the electronic file by email.

The determination unit 17 is mainly implemented by the processing of the CPU 101, and makes various determinations in the information processing apparatus 10. The determination unit 17 determines whether the workflow is feasible by the setting unit 143 in response to an operation on the input screen displayed on the communication terminal 60.

The count service unit 18 is mainly implemented by the processing of the CPU 101, and based on the execution of the workflow, the count service unit 18 counts the usage history (for example, usage amount indicated by counter information) of the component to be counted included in the workflow. The data counted by the count service unit 18 is, for example, the counter information (usage amount). For example, a dedicated upload module is implemented in the count service unit 18, and at a certain interval or in response to an execution of processing by a specific user, data is collected from the logic processing unit 144 and converted into data having a data structure that is acceptable by the billing processing system 90. The data having converted data structure is transmitted by the data exchange unit 11 to the billing processing system 90 that performs billing processing through the communication network 5 according to the time set for each tenant. Further, as another embodiment, instead of the count service unit 18, a component management unit 202 (counter component 219) counts the usage history of the component to be counted included in the workflow when the workflow is executed. In this case, the count value (usage amount) counted by the component management unit 202 (counter component 219) may be transmitted from the data exchange unit 11 to the communication network 5, and further transmitted from the communication network 5 to the billing processing system 90.

The storing and reading unit 19 is mainly implemented by the processing of the CPU 101, stores various data (or information) in the storage unit 1000, and reads various data (or information) from the storage unit 1000. Further, the storage unit 1000 stores the portal screen information 350 indicating the screen content provided by the workflow application 300 and the screen information generation unit 12.

FIGS. 6A and 6B are tables illustrating examples of an application information management table. In the storage unit 1000, an application information management DB 1001 storing application information management tables as illustrated in FIGS. 6A and 6B is implemented.

In the application information management table illustrated in FIG. 6A, an application name, a component identifier (ID) that identifies the component included in the application, and application processing information indicating processing content of the application are stored in association with each application ID that identifies the application. The component ID is identification information that identifies the component. The components include, for example, an OCR function, an image conversion function, and a file upload function. In addition, the component includes a count component that counts the usage history of the component in the previous stage (upper stage) in the workflow. The application processing information includes screen definition which is information to be displayed on the screen used by the user and processing flow information indicating the processing flow in the application. Further, the screen definition includes a data definition indicating data to be displayed on the screen and layout information indicating a screen layout. The processing flow information describes how to use the processing of the document service or the external system link unit 15.

The application information management table illustrated in FIG. 6B includes the same items as the application information management table illustrated in FIG. 6A. However, among the respective IDs indicated as the component IDs, the condition number (condition 1, condition 2, etc.) for identifying the count condition is assigned instead of the component IDs for identifying the counter component. Here, different count settings are assigned to each condition number. Accordingly, in the case of FIG. 6B, even when the count component included in the workflow is not uniquely identified by the component ID as in FIG. 6A, the count settings can be identified by the condition number inserted in the workflow.

FIG. 7 is a conceptual diagram illustrating an example of a data definition. FIG. 7 illustrates an array in which the data definition included in a screen definition is described. The data definition illustrated in FIG. 7 represents a set of a data ID (data_id), a data name (data_key), a data format (format), and a data source (data_source) as the array. The data name is a parameter for processing. The data format is an element that configures the screen and is the same as an HTML form element. The data format is, for example, input_text, textarea, select, radio and the like. The data source indicates a uniform resource locator (URL) that holds the data. When the data source is fixed, the data may be directly described.

FIG. 8 is a conceptual diagram illustrating an example of layout information. FIG. 8 illustrates a data array in which the data ID of the data definition included in the screen definition and layout information holding position information for displaying the screen are described. The layout information illustrated in FIG. 8 expresses a set of the data ID (data_id), the display name (display_name), and the position information (layout) as an array. The position information may be in a form expressed by coordinate information instead of a form (order) in which the order is specified from the top. When displaying the screen on the communication terminal 60 (client) using the client application instead of the browser, or when a screen configuration is complicated, the information processing apparatus 10 may be configured to interpret the data definition on the client or in the screen generation process without the layout information.

FIG. 9 is a table illustrating an example of an application settings management table. In the storage unit 1000, an application settings management DB 1002 storing an application settings management table as illustrated in FIG. 9 is implemented.

In the application settings management table, application settings information associating the component ID that identifies the component included in the application and the settings information that indicates the settings of the component for each application ID that identifies the application is stored. The settings information indicates the setting value (parameter) of the associated component.

FIG. 10 is a table illustrating an example of a billing conditions management table. In the storage unit 1000, a billing conditions management DB 1003 storing the billing conditions management table as illustrated in FIG. 10 is implemented.

In the billing conditions management table, for each contract ID that indicates the identification information of the tenant or the contract to which the tenant is related, a tenant ID that identifies the tenant, the application ID that identifies the application, a user account such as an email address as an example, and billing conditions that indicate the conditions for requesting payment for the component to be counted are stored in association with each other. The billing conditions include a billing frequency indicating frequency of billing, a billing unit, and a calculation formula used for calculating a usage fee. The billing frequency is set to, for example, monthly, weekly, or at any each use. As the billing unit, for example, a unit such as a contract unit, a tenant unit, or a user unit is set. For the calculation formula, for example, a usage fee for each processing count or page is set.

FIGS. 11A and 11B are tables illustrating examples of a count settings management table. In the storage unit 1000, a count settings management DB 1004 including a count settings management table as illustrated in FIG. 11A or FIG. 11B is stored.

In the count settings management table illustrated in FIG. 11A, a count setting (conditional expression) indicating a condition for counting the usage history is stored in association with each count setting ID that identifies the counter component. The count setting ID is the identification information for managing the count settings (conditional expression) described below in association with the count component among the component IDs described with reference to FIG. 6A. The count setting (conditional expression) represents a count target of the component (OCR component). The counting target includes, for example, the number of pages that the OCR is executed, a threshold value (for example, 5 pages or more) of the number of pages, execution timing (for example, when the "execution" instruction is made), and the like. The count settings management table illustrated in FIG. 11A may be used in combination with the application information management table illustrated in FIG. 6A.

In the count settings management table illustrated in FIG. 11B, a count condition indicating the condition for counting is stored in association with the above-mentioned component ID. In FIG. 11B, instead of the count setting ID illustrated in FIG. 11A, the count settings (conditional expression) indicating the condition for counting the usage history is stored for each condition number. The count settings management table illustrated in FIG. 11A may be used in combination with the application information management table illustrated in FIG. 6A. The conditions 1 and 2 illustrated in FIG. 6B indicates conditional expressions corresponding to the values of the count setting IDs (CT00001, CT00002, etc.) of the count settings management DB 1004 illustrated in FIG. 11A. For condition 1, for example, the count setting (conditional expression) "ocr_pages" corresponding to the count setting ID (CT00001) is indicated as the conditional expression. Similarly, for condition 2, for example, the count setting (conditional expression) "ocr_pages" corresponding to the count setting ID (CT00002) is indicated as the conditional expression.

With reference to FIG. 12, a functional configuration of the logic processing unit 144 included in the input/output service processing unit 14 is described in detail. FIG. 12 is a diagram illustrating an example of a detailed configuration of the logic processing unit. As illustrated in FIG. 12, the logic processing unit 144 includes a workflow execution unit 201, a component management unit 202, and a component group 210 in which each component such as a counter component 219 is included.

The workflow execution unit 201, for example, interprets and executes various processes in the external system link unit 15 and the process indicated in the process content that describes the order in which the document service is used. The workflow execution unit 201 calls the component according to the description in the process content to execute the process. The configuration of various processes includes component names, processes, and optional parameters.

The component management unit 202 generates each component included in the workflow requested by the workflow execution unit 201. Further, the component management unit 202 registers and stores each generated component in the component group 210.

The stored components include, for example, OCR, Portable Document Format (PDF), voice conversion, Server Message Block (SMB), File Transfer Protocol (FTP), and counter component 219. Further, each component has identification information (ID) that identifies each component.

With reference to FIG. 13, functional configurations of the communication terminal 60, the image processing apparatus 80, and the billing processing system 90 are described. FIG. 13 is a block diagram illustrating examples of the functional configurations of the image processing apparatus, the communication terminal, and the billing processing system.

The communication terminal 60 includes a data exchange unit 61, a reception unit 62, a display control unit 63, a determination unit 64, and a storing and reading unit 69. Functions of each of these units are implemented by operating any of the components illustrated in FIG. 3 by an instruction from the CPU 601 according to a communication terminal program developed on the RAM 603. Further, the communication terminal 60 includes a storage unit 6000 implemented by at least one hardware resource among the ROM 602, HD 604 and storage medium 615 illustrated in FIG. 3.

The data exchange unit 61 is implemented mainly by the processing of the CPU 601 and the network I/F 609, and exchanges various data or information to and from the information processing apparatus 10 through the communication network 5. Further, the data exchange unit 61 transmits to the information processing apparatus 10, operation information for setting a workflow based on a placement operation of one or more components received by the reception unit 62.

The reception unit 62 is implemented mainly by the processing of the CPU 601 with reference to the keyboard 611 or the pointing device 612, and receives various selections or inputs from the user. Further, the reception unit 62 receives the placement operation of one or more components displayed on the input screen. Further, the reception unit 62 receives input of a plurality of count conditions for the component to be counted.

The display control unit 63 is mainly implemented by the processing of the CPU 601 and controls the display 606 to display various information and images. The display control unit 63 uses, for example, a browser to display a display screen created in HTML or the like on the display 606. Further, the display control unit 63 displays an input screen for inputting a workflow on the display 606. Further, the display control unit 63 displays on the display 606 that the workflow is not set correctly when an error occurs in the placement of the components.

The determination unit 64 is mainly implemented by the processing of the CPU 601 and makes various determinations in the communication terminal 60.

The storing and reading unit 69 is mainly implemented by the processing of the CPU 601, stores various data (or information) in the storage unit 6000, and reads various data (or information) from the storage unit 6000.

The image processing apparatus 80 includes a data exchange unit 81, a reception unit 82, a display control unit 83, a determination unit 84, a processing execution unit 85, and a storing and reading unit 89. Functions of each of these units are implemented by operating any of the components illustrated in FIG. 4 by a command from the CPU 801 according to a program for the image processing apparatus developed on the RAM 802b from the HD 809. Further, the image processing apparatus 80 includes a storage unit 8000 implemented by at least one hardware resource of the ROM 802a and the HD 809 illustrated in FIG. 4.

The data exchange unit 81 is mainly implemented by processing of the CPU 801 with respect to the network I/F 850, and transmits and receives various data or information to and from the information processing apparatus 10 through the communication network 5.

The reception unit 82 is implemented mainly by the processing of the CPU 801 with respect to the control panel 840 and receives various selections or inputs from the user. The display control unit 83 is implemented mainly by the processing of the CPU 801 and controls the control panel 840 to display various images. The display control unit 83 uses, for example, a browser to display a display screen created in HTML or the like on the control panel 840. The determination unit 84 is mainly implemented by the processing of the CPU 801 and makes various determinations in the image processing apparatus 80. The processing execution unit 85 is implemented mainly by the processing of the CPU 801 with respect to the engine controller 830. The processing execution unit 85 executes an image data printing process.

The storing and reading unit 89 is mainly implemented by the processing of the CPU 801, stores various data (or information) in the storage unit 8000, and reads various data (or information) from the storage unit 8000.

The billing processing system 90 includes a communication unit 91, a service processing unit 92, and a storing and reading unit 99. Each of these units is implemented by operating any of the components illustrated in FIG. 3 by an instruction from the CPU 901 according to a billing processing system program developed on the RAM 903. Further, the billing processing system 90 includes a storage unit 9000 implemented by at least one hardware resource among the ROM 902, HD 904 and storage medium 915 illustrated in FIG. 3.

The communication unit 91 is mainly implemented by the processing of the CPU 901, and communicates various data or information with the information processing apparatus 10. The service processing unit 92 is implemented mainly by the processing of the CPU 901 and executes the processing for providing a predetermined service in response to the request from the information processing apparatus 10. In the present embodiment, the predetermined service includes a service provided by executing a predetermined workflow application including a plurality of components (functions).

The storing and reading unit 99 is mainly implemented by the processing of the CPU 901, stores various data (or information) in the storage unit 9000, and reads various data (or information) from the storage unit 9000.

Figure 14:
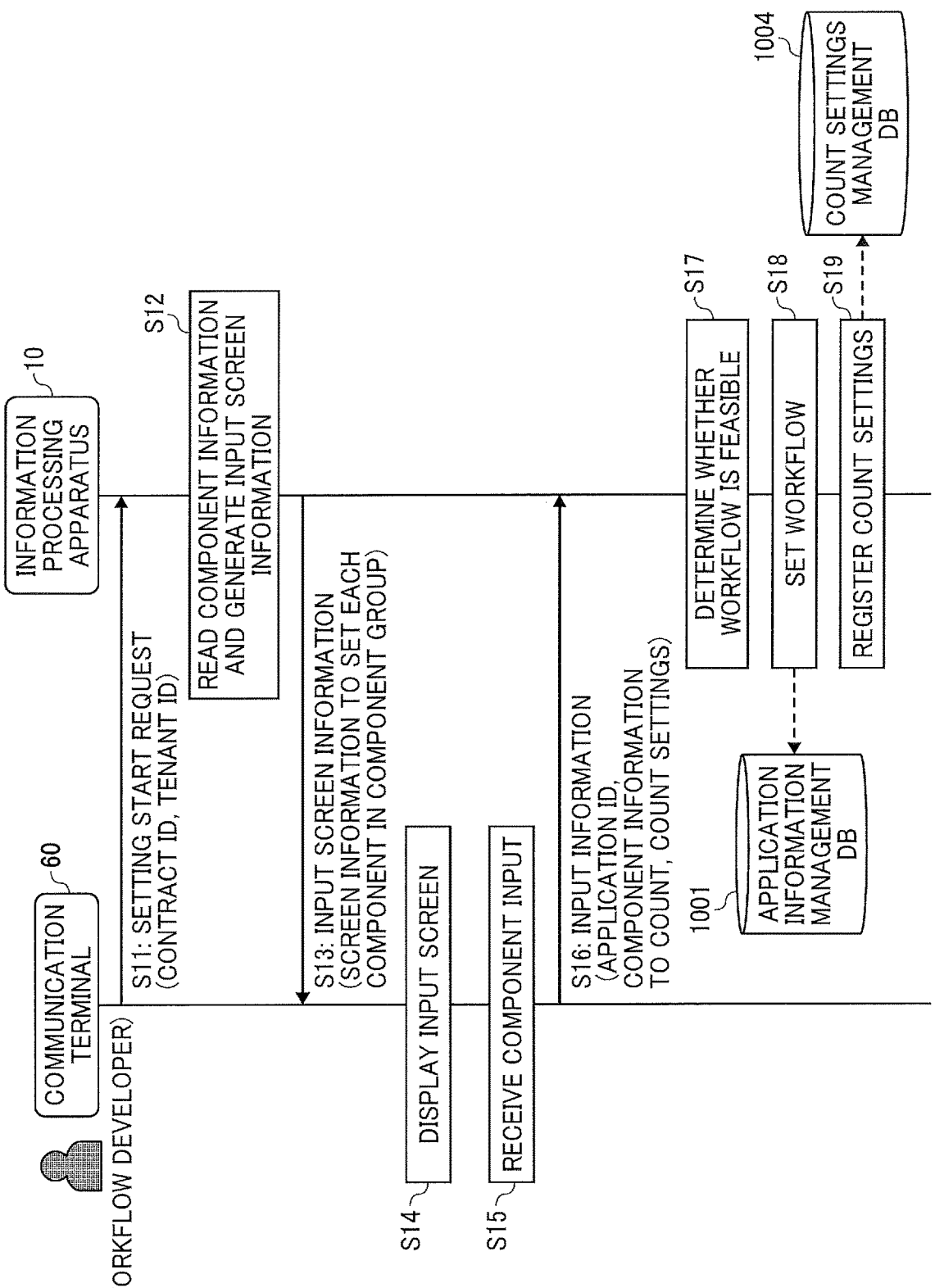
FIG. 14 is a sequence diagram illustrating an example of a workflow setting process.

With reference to FIGS. 14 to 22, processing or operation of the information processing system according to the present embodiment is described. With reference to FIGS. 14 to 22, a process from the creation of a new application initiated by the workflow developer to the registration by the information processing apparatus 10 is described. FIG. 14 is a sequence diagram illustrating an example of the workflow setting process.

In step S11, in response to an input operation or the like on the communication terminal 60 by the workflow developer, the data exchange unit 61 of the communication terminal 60 transmits a setting start request to the information processing apparatus 10. Accordingly, the data exchange unit 11 of the information processing apparatus 10 receives the setting start request transmitted by the communication terminal 60. The setting start request includes the contract ID and the tenant ID.

In step S12, the logic processing unit 144 of the information processing apparatus 10 cooperates with the storing and reading unit 19 to read the component information that configures the input screen information from the component group 210. Specifically, the logic processing unit 144 acquires screen information for setting each component by reading the ID of each component managed by the component group 210. Further, in step S12, the screen information generation unit 12 outputs the portal screen information 350 stored in the storage unit 1000, and generates the input screen information which is the screen information for inputting each component in the communication terminal 60. In step S13, the data exchange unit 11 transmits the generated input screen information to the communication terminal 60. Here, the screen information for setting each component is the screen information for setting a workflow including a plurality of components. Accordingly, the data exchange unit 61 of the communication terminal 60 receives the input screen information which is the screen information for setting each component transmitted from the information processing apparatus 10.

In step S14, the display control unit 63 of the communication terminal 60 displays the workflow input screen 6001 on the display 606 based on the input screen information received in step S13. FIGS. 15A to 15D are diagrams illustrating an example of screen transition of the workflow input screen displayed on the communication terminal. The workflow input screen 6001 illustrated in FIGS. 15A to 15D is an input screen for the workflow developer to make detailed settings of the application. The workflow developer uses the workflow input screen 6001 to set the processing flow executed by each component (function) included in the workflow application.

In response to an input operation (drag and drop, etc.) performed by the workflow developer for each desired component on the workflow input screen 6001, the reception unit 62 of the communication terminal 60 receives the input operation (for example, component input) performed by the workflow developer in step S15.

Figure 15A:
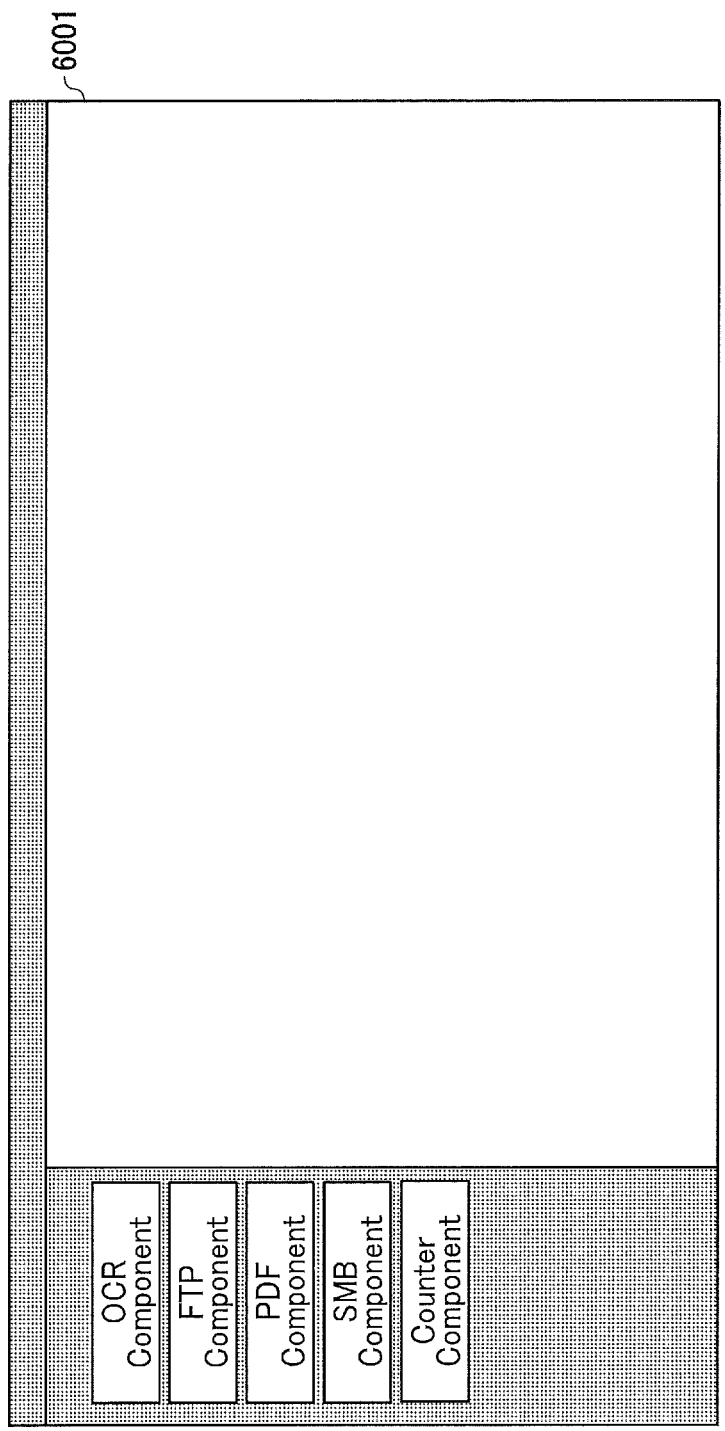

The screen transition of the communication terminal 60 according to the operation (input) performed by the workflow developer in step S15 is described in the following. FIG. 15A is a diagram illustrating an example of screen transition of the workflow input screen displayed on the communication terminal. As illustrated in FIG. 15A, the display control unit 63 of the communication terminal 60 displays the workflow input screen 6001 on the display 606, for example, in response to an operation of the workflow developer. On the workflow input screen 6001, the display control unit 63 displays the components included in the workflow application received in step S13. Specifically, the display control unit 63 displays, for example, the OCR component, the FTP component, the PDF component, the SMB component, and the counter component arranged in a particular area of the workflow input screen 6001. Here, all the components managed by the information processing apparatus 10 may be displayed, or some components may be displayed.

Next, the screen transition when the workflow developer arranges a component on the workflow input screen 6001 is described in the following. FIG. 15B is a diagram illustrating an example of screen transition of the workflow input screen displayed on the communication terminal. As illustrated in FIG. 15B, the workflow developer clicks on any component displayed on the workflow input screen 6001 and by clicking on a blank area of the workflow input screen 6001, the component is placed at the clicked area. Alternatively, an operation such as dragging and dropping is performed on the blank area of the workflow input screen 6001 for any component among the components arranged on the workflow input screen 6001. In the case of FIG. 15B, the workflow developer selects, drags, and drops the OCR component. Accordingly, the display control unit 63 arranges an icon of the OCR component or the like at the position (coordinate position) dropped by the workflow developer on the workflow input screen 6001.

Figure 15C:
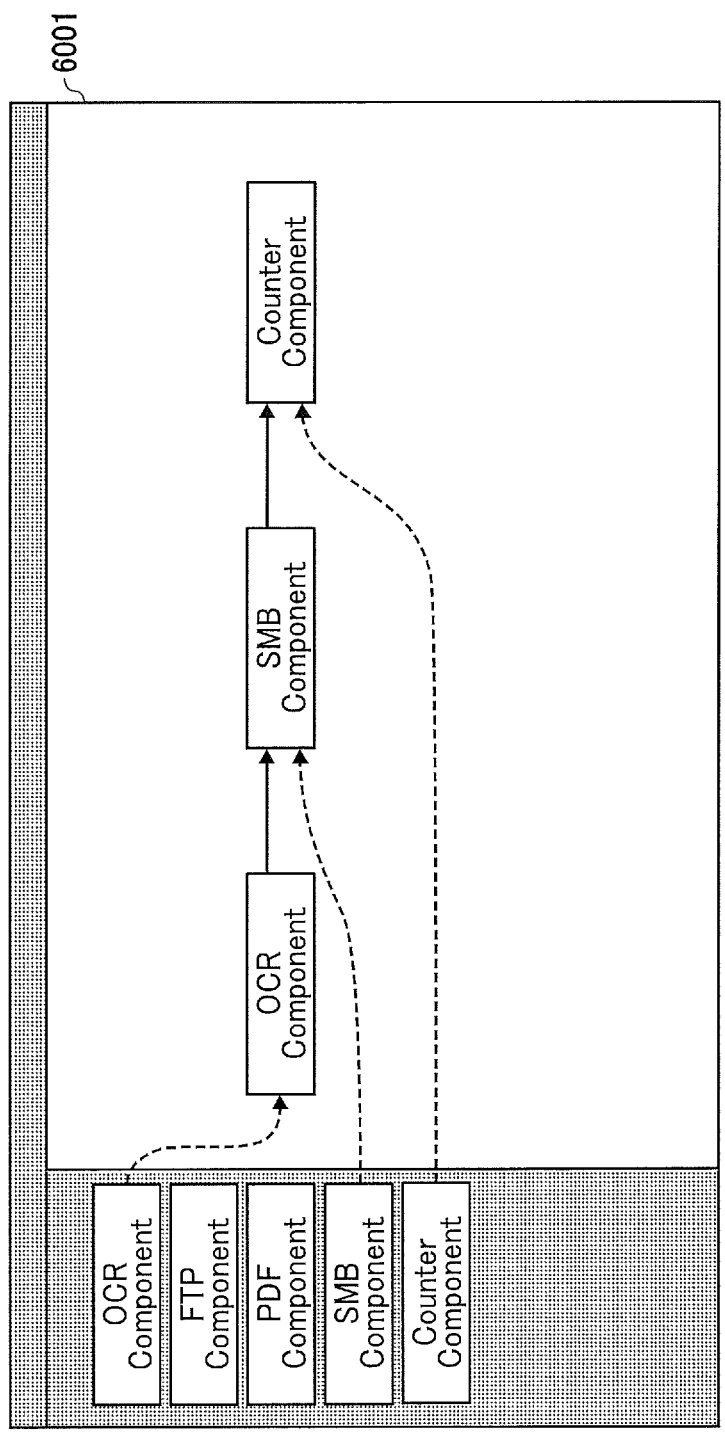

Next, the screen transition when the workflow developer further arranges a component on the workflow input screen 6001 is described in the following. FIG. 15C is a diagram illustrating an example of screen transition of the workflow input screen displayed on the communication terminal. As illustrated in FIG. 15C, the workflow developer drags and drops the SMB component and the counter component in the order of the SMB component and the counter component in the blank area of the workflow input screen 6001 following the OCR component arranged on the workflow input screen 6001. Accordingly, the display control unit 63 arranges the icons of the SMB component and the counter component at the position (coordinate position) dropped by the workflow developer on the workflow input screen 6001. As a result, a workflow is generated in which OCR is executed on a file, the file is saved in the SMB, and then the number of pages in which the OCR is executed is counted up. Further, the OCR component, the SMB component, and the counter component are connected by arrows. Based on a determination that the components are in a positional relationship that can be connected to each other, a user interface (UI) such as an arrow that indicates a connection between the components are displayed at the timing after the workflow developer drags and drops each component using a pointing device such as a mouse.

Figure 15D:
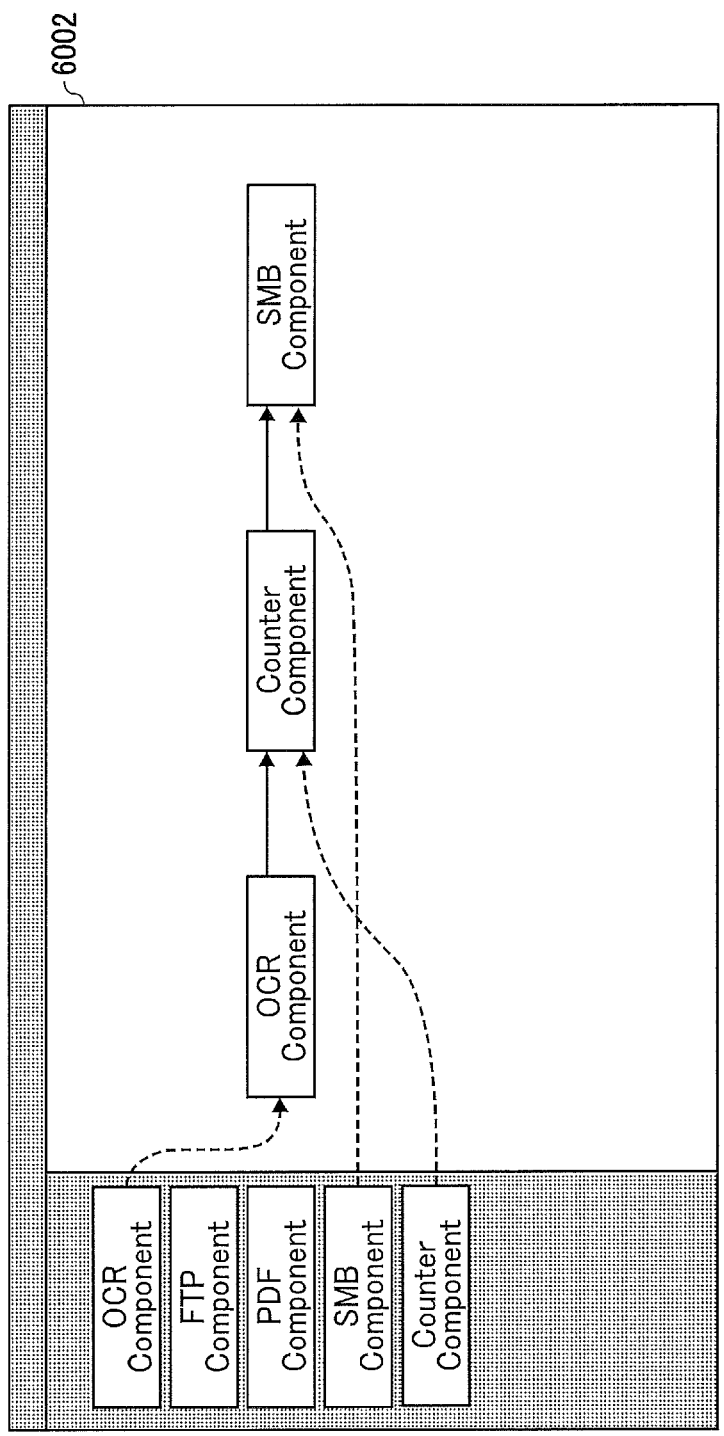

Next, the screen transition when the workflow developer further arranges a component on the workflow input screen 6001 is described in the following. FIG. 15D is a diagram illustrating an example of screen transition of the workflow input screen displayed on the communication terminal. As illustrated in FIG. 15D, the workflow developer drags and drops the counter component and the SMB component into the blank area of the workflow input screen 6002 behind the OCR component arranged on the workflow input screen 6001 in FIG. 15B. Accordingly, the display control unit 63 arranges the icons of the SMB component and the counter component at the position (coordinate position) dropped by the workflow developer on the workflow input screen 6001. As a result, a workflow is generated in which a file is OCR processed, counted, and saved in SMB. Further, the OCR component, the SMB component, and the counter component are connected by arrows.

In the case of FIG. 15D, a workflow is generated in which the number of pages executed by OCR is counted up, and then saved in SMB. In this case, the processing of the SMB component after counting up the number of OCR execution pages is a workflow specification regardless of whether the processing is completed normally.

Returning to FIG. 14, the data exchange unit 61 transmits the input information according to the operation (input) received in step S15 to the information processing apparatus 10 in step S16. As a result, the data exchange unit 11 of the information processing apparatus 10 receives the input information transmitted by the communication terminal 60. The input information includes the application ID of the application for which the input of the application settings is received in step S15, information of the selected count target, and count condition.

FIG. 16 is a conceptual diagram illustrating an example of output data after an execution of OCR process. As the output data after the execution of OCR process illustrated in FIG. 16, for example, a file name: "output.pdf", a file size: "307200", and the number of pages: "5" are indicated.

In step S17, the determination unit 17 of the information processing apparatus 10 determines whether the workflow is feasible by the setting unit 143 based on the input information received in step S16. In this step, the determination unit 17 may determine whether the setting unit 143 can set the workflow.

In step S18, based on a determination by the determination unit 17 that the workflow is feasible, the setting unit 143 of the input/output service processing unit 14 sets in the application information management DB 1001 (see FIG. 6), the workflow including a counter component 219 indicated by input information including the application ID received from the communication terminal 60 in step S16. For example, the application name and the component ID corresponding to the application ID are set in this step. Specifically, the setting unit 143 sets the workflow including the component whose usage history is counted, according to the input information operated (input) on the input screen displayed on the communication terminal 60 based on the input screen information transmitted in step S13.

On the other hand, based on a determination by the determination unit 17 in step S17 that the workflow is not feasible, the information processing apparatus 10 exits this sequence without performing the subsequent processes of steps S18 and S19. In this case, the data exchange unit 11 of the information processing apparatus 10 may transmit a notification to the communication terminal 60 that the workflow is not set.

In step S19, the application management unit 141 of the input/output service processing unit 14 registers in cooperation with the storing and reading unit 19, the count settings in the count settings management DB 1004 (see FIG. 11) in association with the component ID or count condition (condition) included in the application information management DB 1001 (see FIG. 6) set in step S16. Specifically, the application management unit 141 registers the count settings (conditional expression) in the count settings management DB 1004 (see FIG. 11) as the count settings included in the application settings in association with the component ID or the count conditions included in the application information management DB 1001 (see FIG. 6) set in step S16.

As described above, the information processing apparatus 10 generates the workflow application including the plurality of components in response to the operation input by the workflow developer or the like.

In the information processing system according to the present embodiment, for example, when the processes of steps S11 and S13 described above are executed, another device or the like may reside between the communication terminal 60 and the information processing apparatus 10. In other words, each information (data) transmitted and received between the communication terminal 60 and the information processing apparatus 10 may be configured to be transmitted and received through another device. The configuration described above is applicable with another processing step executed between the communication terminal 60 and the information processing apparatus 10.

Figure 17:
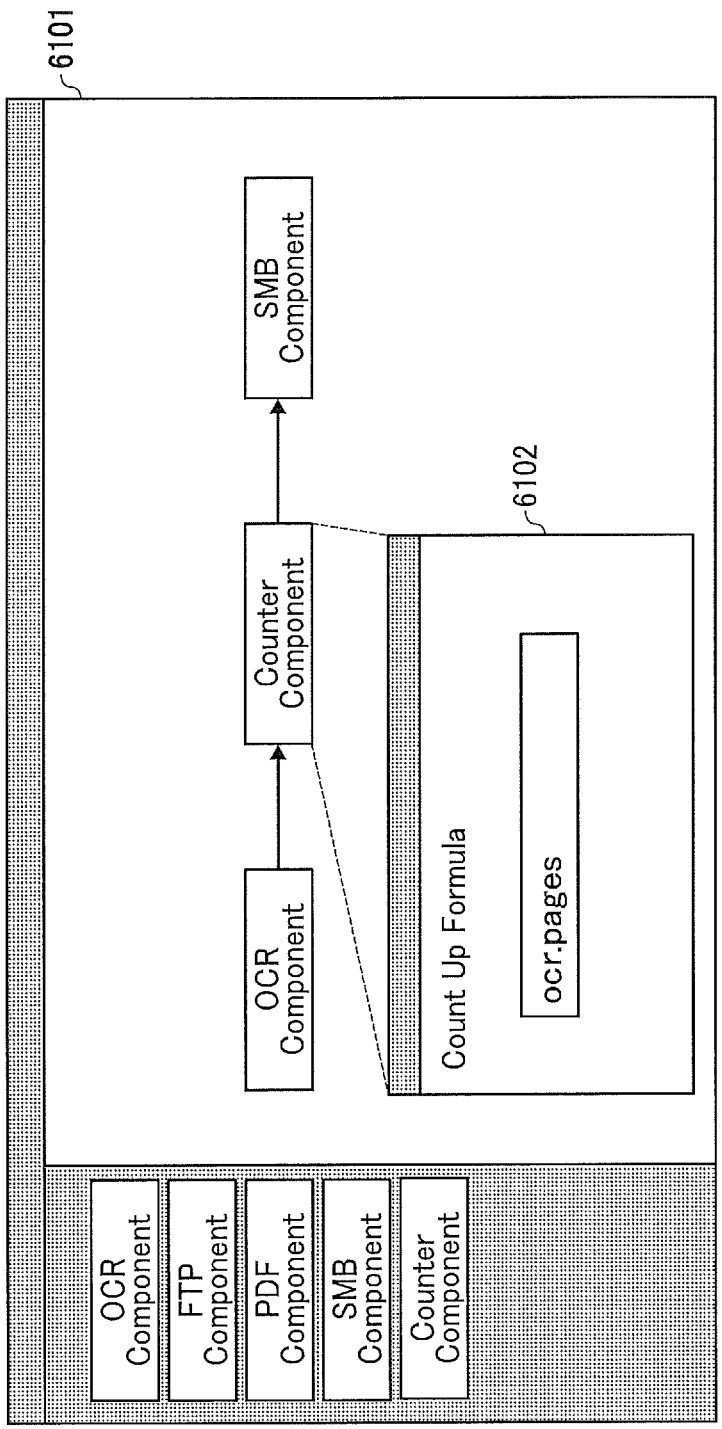
FIG. 17 is a diagram illustrating an example of inputting count-up formula on the workflow input screen displayed on the communication terminal.

FIG. 17 is a diagram illustrating an example of count-up input of the workflow input screen displayed on the communication terminal. As illustrated in FIG. 17, the display control unit 63 of the communication terminal 60 displays the workflow input screen 6101 on the display 606. In FIG. 17, the display control unit 63 displays for the counter component displayed on the workflow input screen 6101 illustrated in FIG. 15D, for example, a count-up formula 6102 for executing the count-up as a dialog in a pop-up. The display of count-up formula 6102 is not limited to the dialog displayed in the pop-up, and may be provided in, for example, a frame indicating a component arranged by the workflow developer or the like. The display of count-up formula 6102 allows the workflow developer to set a count condition for the screen on which the component including the count-up formula 6102 is displayed. The pop-up display may avoid blocking the display of other components. In the example illustrated in FIG. 17, in response to setting the formula "ocr.pages" in the count-up formula 6102 as the output data after OCR by the workflow developer, the setting unit 143 sets the value "5" corresponding to "pages" as described with reference to FIG. 16. As a method to confirm the current count value on the application, the description including the count value may be automatically set (generated) from the placement of the counter component in the setting of workflow. For example, based on the count-up formula "ocr.pages", the setting unit 143 determines the target component by "ocr" and the count target by "pages". On the other hand, the setting unit 143 sets (generates) the explanatory text by applying the explanatory text to a fixed phrase such as "{{unit}} currently executed by {{component}} is {counter}." The count-up expression is, for example, in the form of {{component}}. {{unit}}. In the case of the expression "ocr.pages", the component is the "ocr" key and the unit is the "pages" key. By holding a predetermined label for each key in this way, the label corresponding to the ocr key is managed as OCR, and the label corresponding to pages is managed as the number of pages, and the setting unit 143 sets (generates) a fixed phrase "The number of pages currently executed by OCR is {counted}." As described above, the workflow includes a counter component that counts the usage history of the component to be counted based on the count conditions set according to the operation on the input screen displayed on the communication terminal 60. In response to an execution of the counter component included in the workflow, the counter component counts the usage history of the component to be counted.

Figure 18:
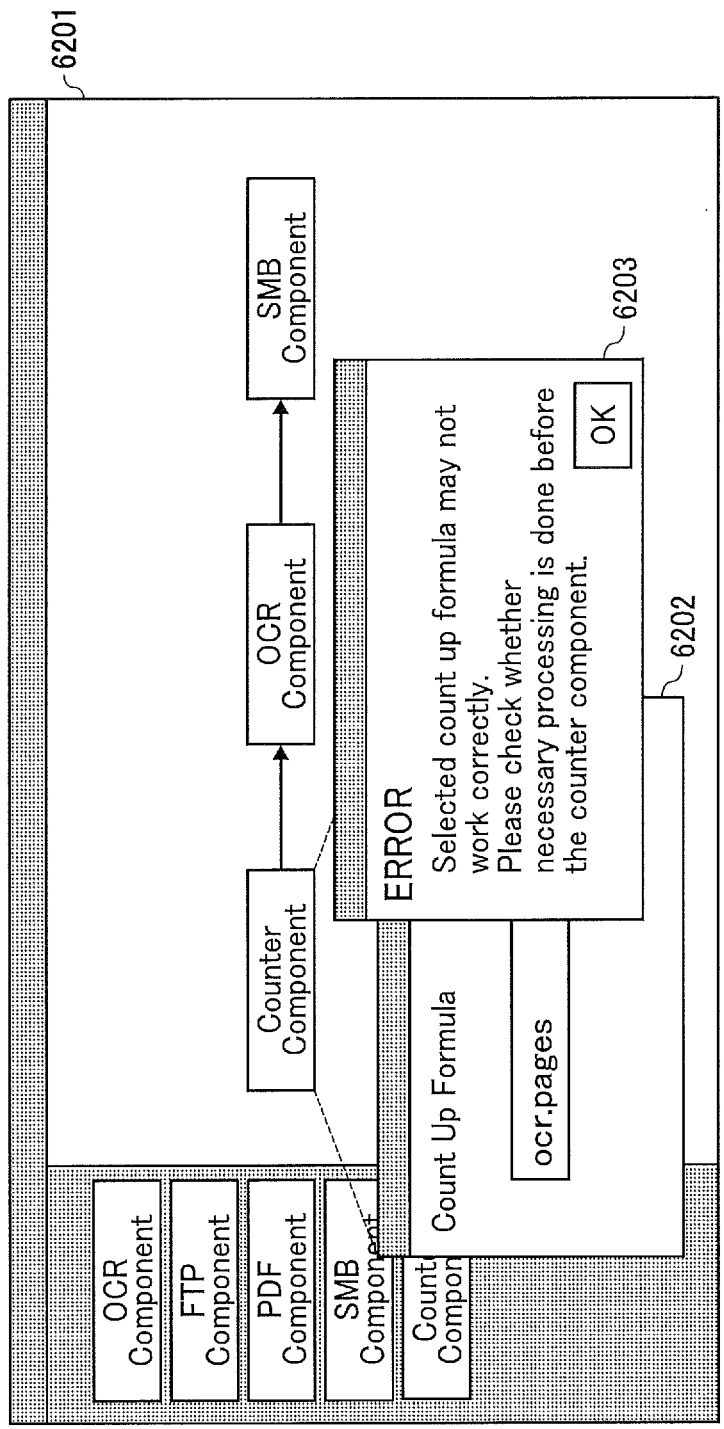
FIG. 18 is a diagram illustrating an example of displaying an error on the workflow input screen displayed on the communication terminal.

FIG. 18 is a diagram illustrating an example of displaying an error on the workflow input screen displayed on the communication terminal. As illustrated in FIG. 18, the display control unit 63 of the communication terminal 60 displays the workflow input screen 6201 on the display 606. In FIG. 18, the display control unit 63 displays a pop-up presenting the count-up formula 6202 displayed in a dialog for executing a count-up for the counter component among the counter component, the OCR component, and the SMB component dragged and dropped by the workflow developer.

The example illustrated in FIG. 18 is an example of a screen displayed in response to an occurrence of the error as a result of the determination unit 17 of the information processing apparatus 10 executing a process to determine whether workflow is feasible in step S17 described above. Specifically, when a workflow is saved by a workflow creation editor, the determination unit 17 of the information processing apparatus 10 checks whether the process corresponding to the count-up formula "ocr" exists in a previous stage of the counter component. Here, the previous stage refers to the position where the executed process is placed looking from the component in which the processing is currently executed. In other words, the previous stage refers to the position corresponding to the past processing on the time axis. On the other hand, the latter stage refers to the position where the unexecuted processing is placed looking from the component in which the processing is currently executed. In other words, the latter stage is the position corresponding to future processing on the time axis. Based on a result of checking that the process corresponding to the count-up expression "ocr" does not exist in the previous stage of the counter component, (in other words, when the counter component is placed before the component to be counted) since count-up is not possible, the data exchange unit 11 transmits the notification screen information to display the notification screen indicating that the workflow is not set to the communication terminal 60.

Then, the display control unit 63 of the communication terminal 60 displays an error screen 6203 presenting the error dialog based on the notification screen information transmitted by the information processing apparatus 10. As for the display method of the error screen 6203, the dialog of the error screen 6203 may be displayed in a pop-up so as to be superimposed on the dialog of the count-up formula 6202 as illustrated in FIG. 18. In other words, the information processing apparatus 10 cooperates with the communication terminal 60 to notify the user of the error. In addition to the above case, error notification is made in the case where multiple counter components are arranged in the same count-up formula. Alternatively, the determination process by the determination unit 17 may be executed regardless of the type of workflow.

Figure 19:
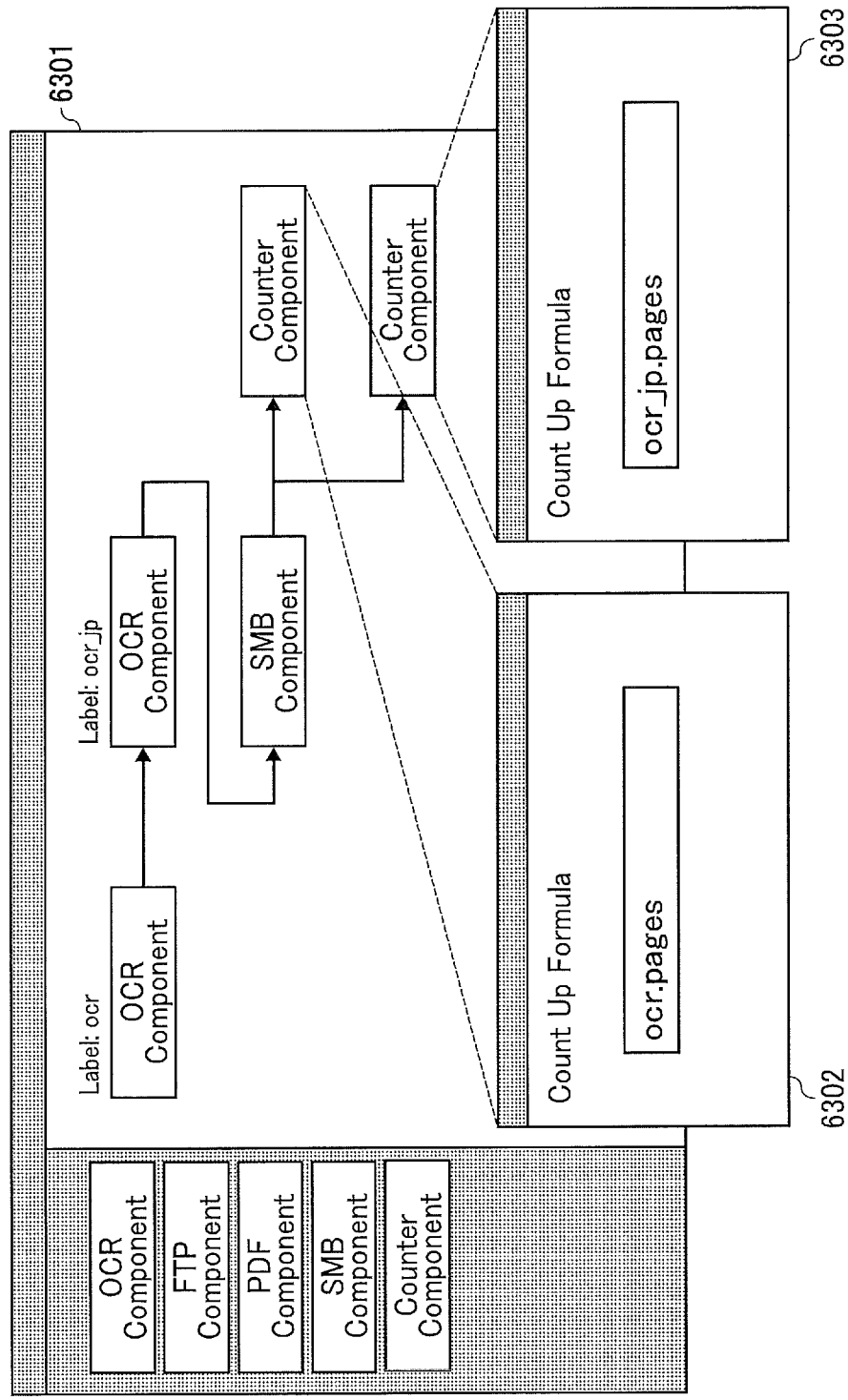
FIG. 19 is a diagram illustrating an example of displaying a plurality of counter components on the workflow input screen displayed on the communication terminal.

FIG. 19 is a diagram illustrating an example of displaying a plurality of counter components on the workflow input screen displayed on the communication terminal. As illustrated in FIG. 19, the display control unit 63 of the communication terminal 60 displays the workflow input screen 6301 on the display 606. In FIG. 19, the display control unit 63 displays each component (OCR component, OCR component, SMB component) included in the workflow application in order, and connects each component with the arrows. Further, the display control unit 63 displays two counter components side by side in parallel after the SMB component, and connects the SMB components in the front stage to each counter component with an arrow. Further, the display control unit 63 pops-up the dialogs of the count-up formula 6302 and the count-up formula 6303 for each of the two counter components.

Of the two counter components displayed in parallel, "ocr.pages" is displayed in the dialog of the count-up formula 6302 of one counter component, and "ocr_jp.pages" is displayed in the dialog of the count-up formula 6303 of the other counter component. In the workflow set in this way, a plurality of OCR components is placed. In such case, the workflow developer can set any label in the workflow to identify the same component. In the case the label with an expression is set in each counter component by the workflow developer, the number of pages output by Label:ocr and the number of pages output by Label:ocr_jp is counted up respectively.

Figure 20:
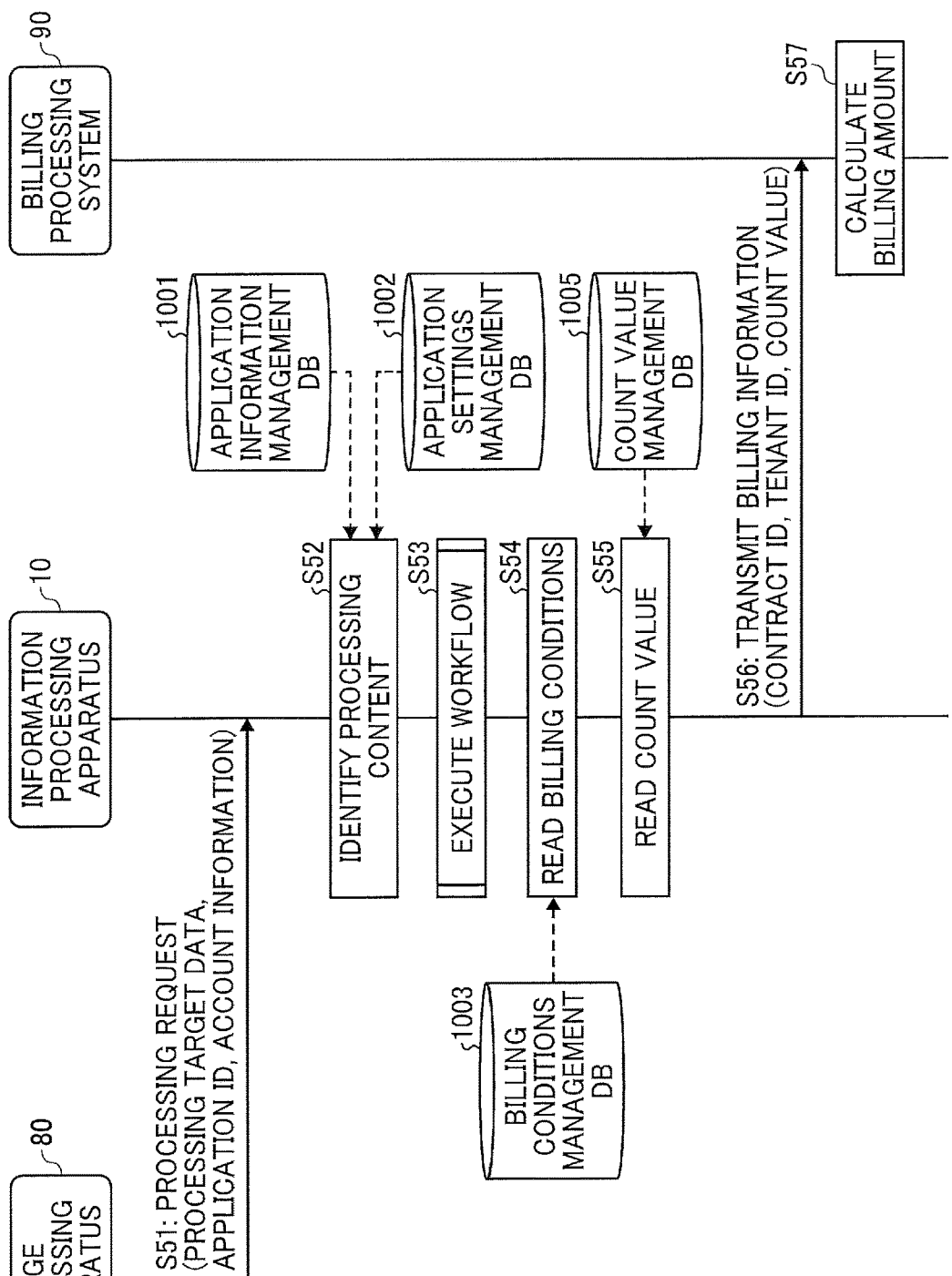
FIG. 20 is a sequence diagram illustrating an example of a billing information transmission process.

Next, the workflow execution process when the service is used by the service user is described in the following. FIG. 20 is a sequence diagram illustrating an example of a billing information transmission process. FIG. 20 illustrates a process up to transmission to the billing processing system 90 of the usage history counted by the counter component included in the workflow according to the time set for each tenant. In step S51, the data exchange unit 81 of the image processing apparatus 80 transmits a processing request to the information processing apparatus 10. Accordingly, the data exchange unit 11 of the information processing apparatus 10 receives the processing request transmitted from the image processing apparatus 80. The processing request includes the processing target data, the application ID, and the account information.

In step S52, the application management unit 141 of the input/output service processing unit 14 identifies the processing content. Specifically, the application management unit 141 searches for the application information management DB 1001 (see FIG. 6) using the received application ID as a search key, and obtains a corresponding application name and a component ID that identifies a component included in the application. Further, the application management unit 141 identifies the language information as the settings information and the destination information such as the destination and carbon copy (CC) by searching the application settings management DB 1002 (see FIG. 9) using the identified component ID as a search key.

In step S53, the document service unit 16 executes a predetermined process included in a series of processes based on the identified process content (process flow information). As described above, since the document service unit 16 includes the OCR processing unit 161 and the file conversion unit 162, each processing is executed by a functional unit according to the processing content identified in step S52.

Figure 21A:
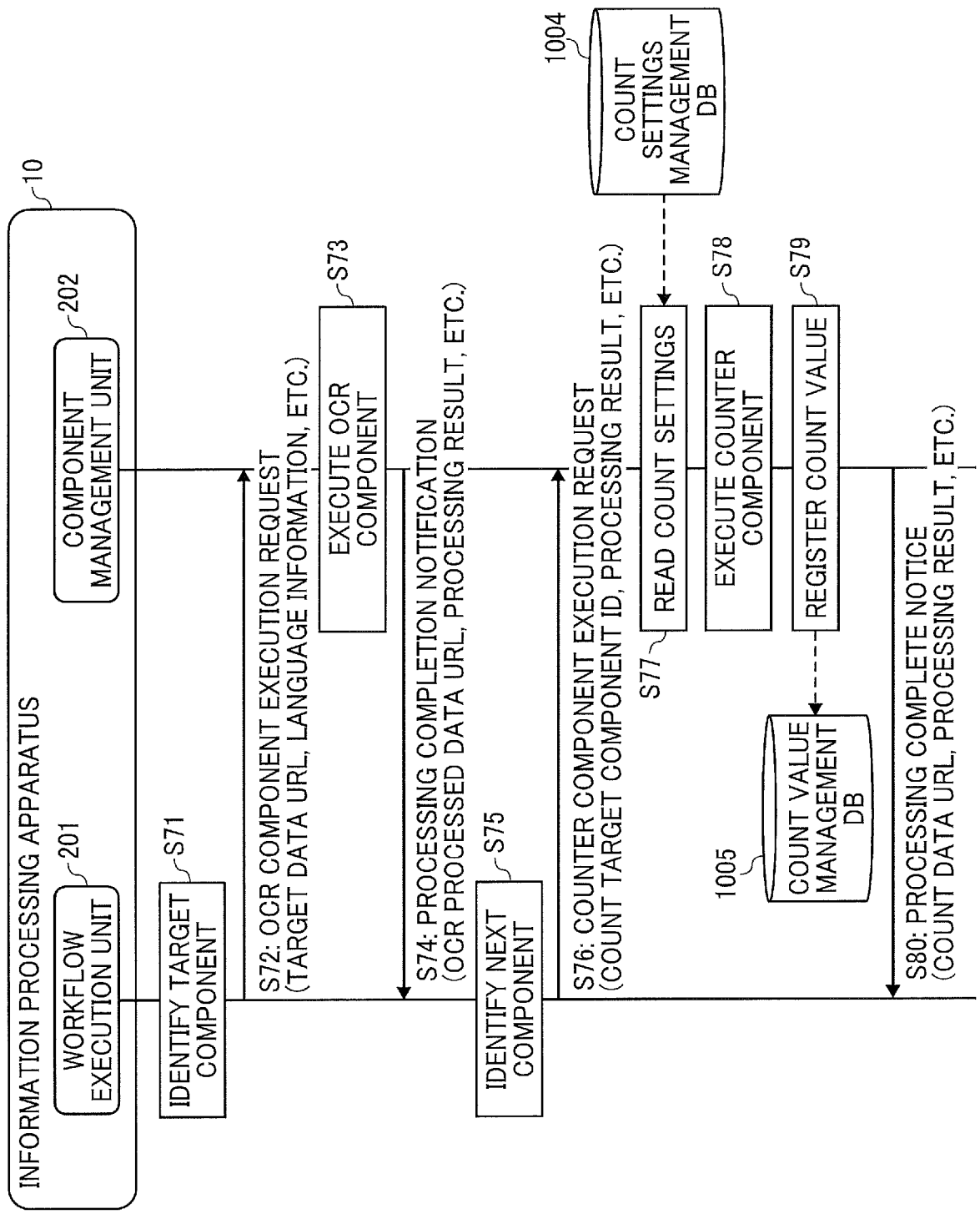
FIGS. 21A and 21B are a sequence diagram illustrating an example of detailed process of executing a workflow.
Figure 21B:
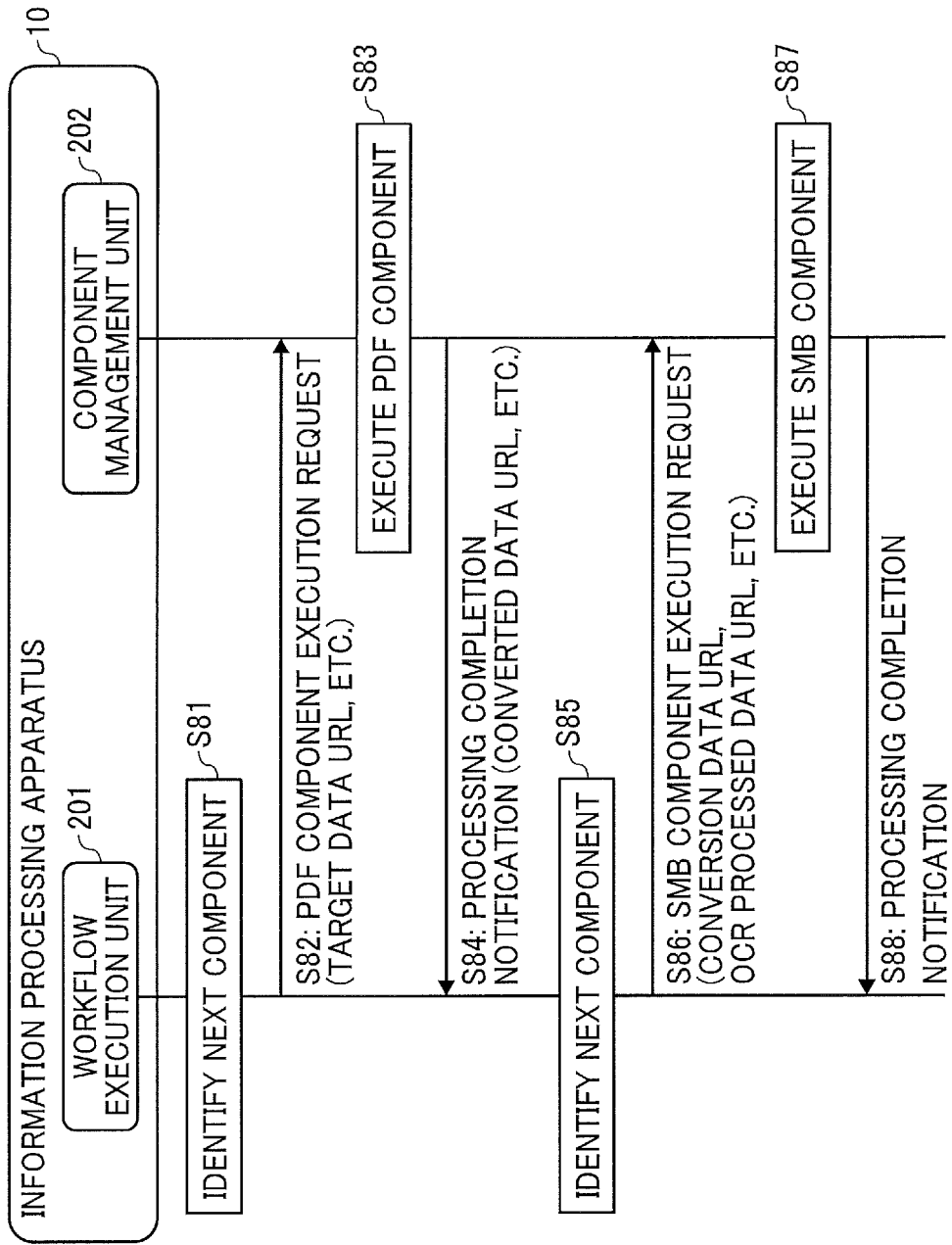

FIGS. 21A and 21B are a sequence diagram illustrating an example of detailed process of executing a workflow. In FIGS. 21A and 21B, an example of executing "workflow application B" among the applications managed by the application information management DB 1001 (see FIG. 6) as the processing content of the workflow identified in step S52 is described. The description is made based on the examples illustrated in FIGS. 6A and 11A, respectively, with respect to the data tables stored in the application information management DB 1001 (see FIGS. 6A and 6B) and the data tables stored in the count settings management DB 1004 (see FIGS. 11A and 11B).

As illustrated in FIG. 21A, in step S71, the workflow execution unit 201 of the information processing apparatus 10 identifies the OCR component as the first component to be processed from the workflow B to be executed.

In step S72, the workflow execution unit 201 transmits an OCR component execution request to the component management unit 202. Accordingly, the component management unit 202 receives the OCR component execution request from the workflow execution unit 201. The OCR component execution request includes the URL and language information of the target data identified in step S52.

In step S73, the component management unit 202 executes OCR processing using the OCR component identified in step S71 stored in the component group 210.

In step S74, the component management unit 202 transmits the processing completion notification to the workflow execution unit 201. Accordingly, the workflow execution unit 201 receives the processing completion notification from the component management unit 202. The processing completion notification includes the URL of the target data and the language information.

In step S75, the workflow execution unit 201 identifies a counter component as a component of the next process of the workflow application B.

In step S76, the workflow execution unit 201 transmits a counter component execution request to the component management unit 202. Accordingly, the component management unit 202 receives the counter component execution request from the workflow execution unit 201. The counter component execution request includes the component ID that identifies the OCR component that is the component to be counted, and the processing result by the OCR component.

In step S77, the component management unit 202 reads the corresponding count settings by searching the count settings management DB 1004 (see FIGS. 11A and 11B) using the count setting ID or the counter condition that identifies the target counter component as a search key.

In step S78, the component management unit 202 causes the counter component 219 identified in step S75 to execute the counting process. Specifically, the counter component 219 counts the usage history of the OCR component to be counted based on the count settings read in step S77. For example, in the case the count setting is "ocr_pages", the counter component 219 counts the usage amount (for example, the number of pages) of the OCR component to count the usage history. Further, for example, in the case the count setting is "executions", the counter component 219 counts the number of processes of the OCR component to count the usage history.

FIGS. 22A and 22B are tables illustrating examples of count value management tables. In the storage unit 1000, a count value management DB 1005 storing count value management tables as illustrated in FIG. 22A and FIG. 22B is implemented.

In the count value management table illustrated in FIG. 22A, the tenant ID, the user account, and the count value are stored in association with each contract ID described above. In the count settings management table illustrated in FIG. 22B, the tenant ID, the user account, the keyword, and the count value are stored in association with each contract ID described above. Among these, the keyword is information associated with a label input by the communication terminal 60, and includes the above-mentioned "ocr_pages", "evacuations", and the like. The count value managed in the count value management table is, for example, the number of pages.

Returning to FIG. 21A, in step S79, the component management unit 202 stores (registers) the counter value obtained in the count process in the count value management DB 1005 (see FIG. 22), and in step S80, notifies the workflow execution unit 201 of the completion of process. Accordingly, the workflow execution unit 201 receives the processing completion notification from the component management unit 202. As described above, when the counter component 219 executes the count process after the OCR component is executed, the component management unit 202 does not have to store the count value obtained by the count process in the count value management DB (see FIG. 22). In that case, the data exchange unit 11 may transmit the count value to the billing processing system 90 through the communication network 5 when the count value is obtained by the counter component 219.

In FIG. 21B, in step S81, the workflow execution unit 201 identifies a PDF component which is an example of image conversion as a component of the next process of the workflow application B.

In step S82, the workflow execution unit 201 transmits the PDF component execution request to the component management unit 202. Accordingly, the component management unit 202 receives the OCR component execution request from the workflow execution unit 201. The PDF component execution request includes the URL of the data to be image-converted.

In step S83, the component management unit 202 executes the image conversion process as an example of the execution content of the PDF component.

In step S84, the component management unit 202 transmits the processing completion notification to the workflow execution unit 201. Accordingly, the workflow execution unit 201 receives the processing completion notification from the component management unit 202. The processing completion notification includes the URL of the image-converted data and the like.

In step S85, the workflow execution unit 201 identifies an SMB component as a component of the next process of the workflow application B.

In step S86, the workflow execution unit 201 transmits the SMB component execution request to the component management unit 202. Accordingly, the component management unit 202 receives the OCR component execution request from the workflow execution unit 201. The SMB component execution request includes the URL of the data to be converted, the URL of the OCR processing data, and the like.

In step S87, the component management unit 202 executes a file sharing process or the like as an example of the execution content of the SMB component.

In step S88, the component management unit 202 transmits the processing completion notification to the workflow execution unit 201. Accordingly, the workflow execution unit 201 receives the processing completion notification from the component management unit 202. As described above, the information processing apparatus 10 executes a predetermined workflow including the plurality of components operated (input) by the workflow developer or the like.

Returning to FIG. 20, in step S54, the storing and reading unit 19 of the information processing apparatus 10 reads the corresponding billing conditions by searching the billing conditions management DB 1003 (see FIG. 10) using the application ID received in step S51 as a search key. The billing conditions read here include the billing frequency, the billing unit, and the calculation formula.

In step S55, the storing and reading unit 19 reads the corresponding count value by searching the count value management DB 1005 (see FIG. 22) using the user account, which is an example of the account information received in step S51, as a search key.

In step S56, the data exchange unit 11 transmits the billing information for the workflow used by the user to the billing processing system 90. Accordingly, the communication unit 91 of the billing processing system 90 receives the billing information transmitted by the information processing apparatus 10. The billing information includes the contract ID, the tenant ID, and the count value read in step S55. In other words, in step S56, the data exchange unit 11 transmits the usage history (count value) counted by the count service unit 18 to the billing processing system 90 according to the condition, timing, etc. set for each tenant.

In step S57, the service processing unit 92 of the billing processing system 90 calculates a usage fee based on the count value included in the billing information. Specifically, the billing processing system 90 calculates the usage fee based on the count value included in the billing information received in step S56 and the billing conditions for each user stored in advance in the storage unit 9000. The billing conditions stored in the storage unit 9000 are the same as the billing conditions stored in the billing conditions management DB 1003.

In this way, the information processing apparatus 10 sets the workflow including the plurality of components set according to the operation (input) by the workflow developer or the like. Further, the information processing apparatus 10 executes the set workflow and transmit the count value obtained by the executed workflow to the billing processing system 90 at a specific time. As a result, the billing processing system 90 can calculate the usage fee based on the received count value.

In the above-described embodiment, an example of calculating the usage fee based on the usage history (count value) received by the billing processing system 90 is illustrated, however, the information processing apparatus 10 may calculate the usage fee based on the count value obtained in the executed workflow.

In this case, the component management unit 202 (counter component 219) multiplies the billing conditions (billing frequency, billing unit, calculation formula, etc.) read in step S54 by the count value stored in the count value management DB 1005 (see FIG. 22) to calculate the usage fee. The usage amount calculated by the component management unit 202 may be transmitted to the billing processing system 90 by the data exchange unit 11 at the processing time of step S56 described above, for example.

In the information processing system according to the present embodiment, for example, when the process of step S51 described above is executed, another device or the like may reside between the image processing apparatus 80 and the information processing apparatus 10. In other words, each information (data) transmitted and received between the image processing apparatus 80 and the information processing apparatus 10 may be configured to be transmitted and received through another device. The configuration described above is applicable with another processing step executed between the image processing apparatus 80 and the information processing apparatus 10.

Further, in the information processing system according to the present embodiment, for example, when the process of step S57 described above is executed, another device or the like may reside between the information processing apparatus 10 and the billing processing system 90. In other words, each information (data) transmitted and received between the image processing apparatus 80 and the information processing apparatus 10 may be configured to be transmitted and received through another device. The configuration described above is applicable with another processing step executed between the image processing apparatus 80 and the information processing apparatus 10.

As described above, according to the present embodiment, the information processing apparatus 10 transmits screen information for setting each acquired component to the communication terminal 60 (step S13) and a workflow including the counter component 219 indicated by the input information received from the communication terminal 60 is set in the application information management DB 1001 (see FIG. 6) (step S18).

After that, the information processing apparatus 10 executes the counting process by the counter component 219 included in the workflow (step S78). As a result, the information processing system 1 has an effect that when a workflow including a plurality of components is executed, the usage history of the components according to the set counting method can be counted.

Further, the information processing system 1 transmits the counted usage history to the billing processing system 90 according to the billing conditions set for each tenant corresponding to the workflow, the timing, and the like (step S57). It is possible to perform pay-as-you-go processing associated with workflow processing at any time independent of the processing time at which the set workflow processing is executed.

Further, since the information processing system 1 provides a UI on which a workflow including any component can be input on the communication terminal 60 used by the workflow developer (step S14), the workflow developers is able to develop workflow applications with a high degree of flexibility.

Figure 23:
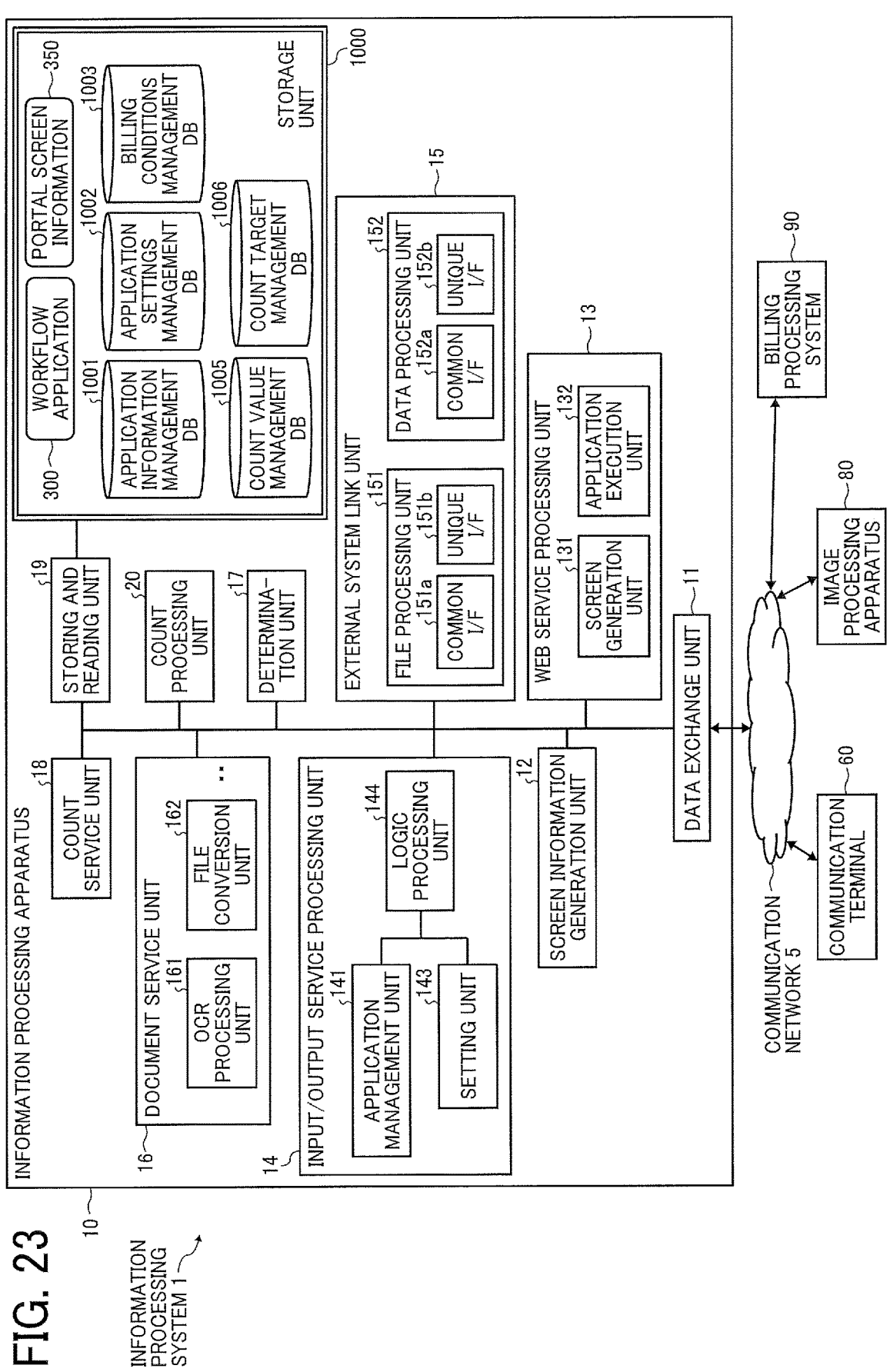
FIG. 23 is a block diagram illustrating another example of a functional configuration of the information processing system.

A modification of the embodiment is described in the following. FIG. 23 is a diagram illustrating another example of the functional configuration of the information processing system. In the modified example of the embodiment, a component to be counted up is set in advance by the input/output service processing unit 14. In the comparison of the functional configuration in the above-described embodiment, the difference is that the count processing unit 20 is placed outside the logic processing unit 144, instead of the counter component 219 included in the logic processing unit 144 in the input/output service processing unit 14. Further, the count target management DB 1006 (see FIG. 25) is newly implemented in place of the count settings management DB 1004 (see FIG. 11) implemented in the storage unit 1000. The system configuration and the hardware resources implementing each system are the same as those in the above-described embodiment.

FIG. 24 is a table illustrating another example of the application information management table. The difference from the application information management DB 1001 illustrated in FIGS. 6A and 6B is that the component ID corresponding to the counter component 219 is not stored as the component ID. This difference is due to the fact that the above-mentioned count processing unit 20 is arranged outside the logic processing unit 144 instead of the counter component 219.

FIG. 25 is a table illustrating an example of the count target management table. In the storage unit 1000, the count target management DB 1006 storing the count target management table as illustrated in FIG. 25 is stored. In the count target management table, the component ID and the count settings are stored in association with each other. In the count target management table, the count settings are stored in association with the component IDs related to the OCR process and the email transmission, respectively, but the count settings are not stored in association with the other component IDs.

With reference to FIGS. 26 and 27, the processing or operation of the information processing system according to the modified example of the embodiment is described. With reference to FIG. 26, a process from the creation of a new application by the workflow developer to the registration by the information processing apparatus 10 is described. FIG. 26 is a sequence diagram illustrating another example of workflow setting process by the workflow developer. In FIG. 26, each process of steps S101 to S108 is the same as each process of steps S11 to S18 illustrated in FIG. 14, and thus the description thereof is omitted.

In step S109, the application management unit 141 of the input/output service processing unit 14 stores the count settings in association with the component ID or the count conditions stored in the application information management DB 1001 (see FIG. 6) set in step S16, in the count target management DB 1006 (see FIG. 25) in cooperation with the storing and reading unit 19. Specifically, the application management unit 141 stores the count settings corresponding to the component ID to be counted in the corresponding count settings item of the count target management DB 1006 (see FIG. 25) in association with the component ID included in the application information management DB 1001 (see FIG. 6) set in step S16.

Figure 27A:
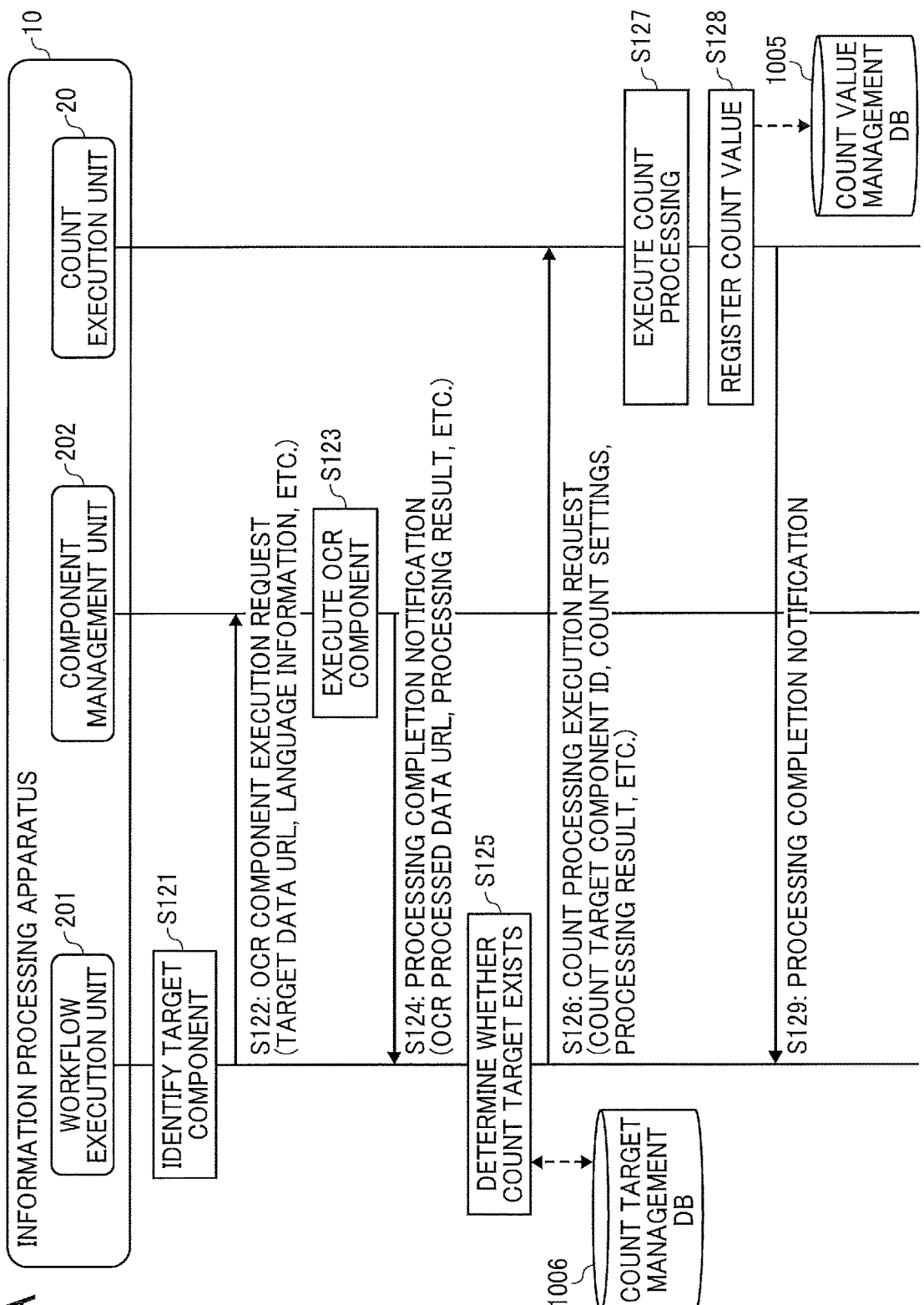
FIGS. 27A and 27B are a sequence diagram illustrating an example of detailed process of executing the workflow.
Figure 27B:
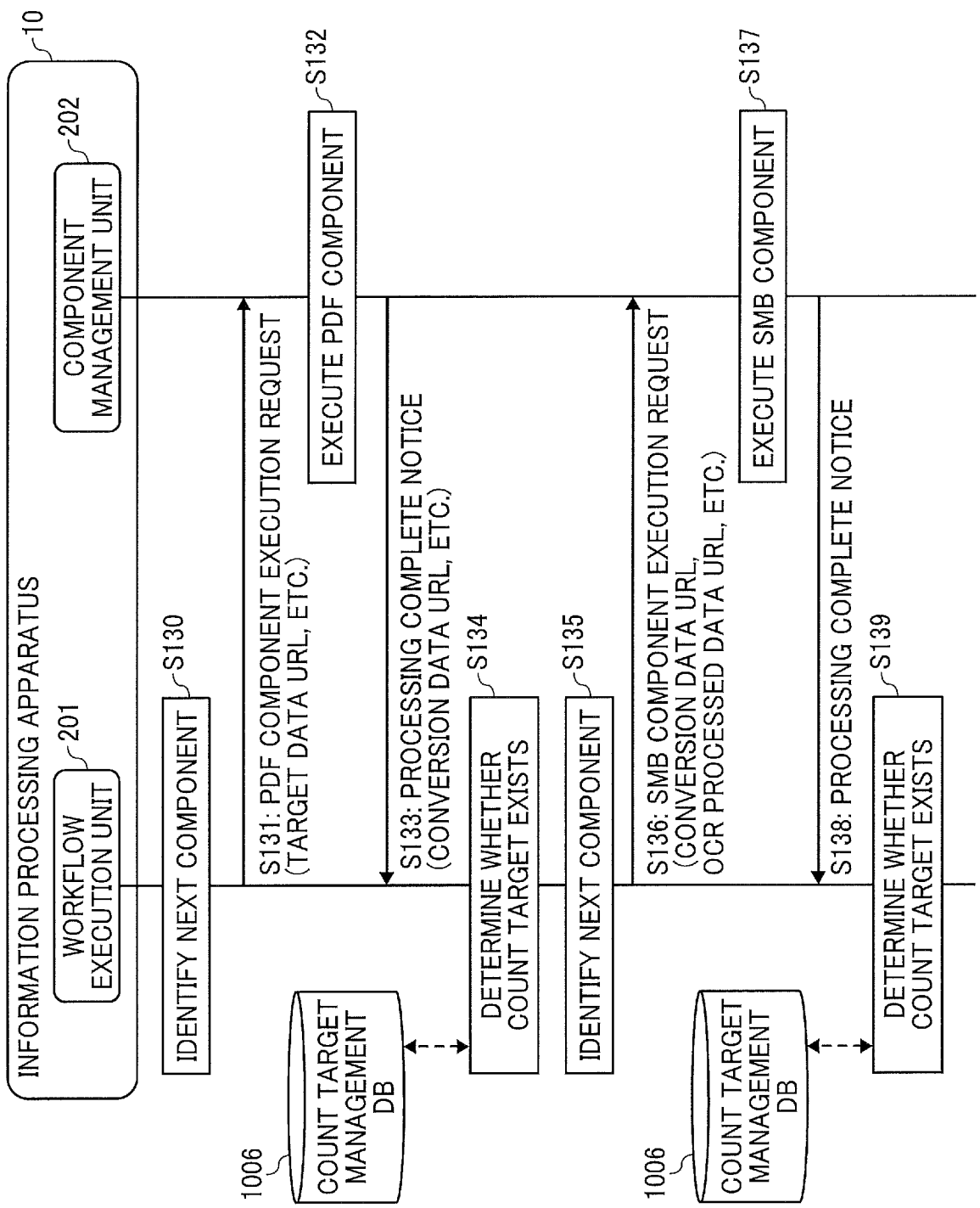

FIGS. 27A and 27B are a sequence diagram illustrating an example of detailed process of executing the workflow. In FIG. 27A, each process up to steps S121 to S124 is the same as each process up to steps S71 to S74 in FIG. 21A described above, and thus description thereof is omitted.

In step S125 the workflow execution unit 201 searches the count target management DB 1006 (see FIG. 25) using the component ID as a search key, and determines the presence or absence of the count target from the presence or absence of the corresponding count settings. In this process, the OCR process is determined as the count target.

In step S126, based on a determination that the count target is present, the workflow execution unit 201 transmits a count processing execution request to the count processing unit 20. Accordingly, the count processing unit 20 receives the count processing execution request transmitted by the workflow execution unit 201. The count process execution request includes the component ID of the OCR process to be counted, the count settings, the process result, and the like.

In step S127, the count processing unit 20 executes count processing and in step S128, stores the calculated counter value in the count value management DB 1005 (see FIG. 22).

In step S129, the count processing unit 20 transmits the processing completion notification to the workflow execution unit 201. Accordingly, the workflow execution unit 201 receives the processing completion notification transmitted by the count processing unit 20.

Since each process up to steps S130 to S133 after receiving the process completion notification transmitted by the count processing unit 20 is the same as each process up to steps S81 to S84 in FIG. 21B described above, the description thereof is omitted.

In step S134, the workflow execution unit 201 searches the count target management DB 1006 (see FIG. 25) using the component ID as a search key, and determines the presence or absence of the count target from the presence or absence of the corresponding count settings. In this process, the SMB process is determined as the count target.

In step S135, based on a determination that a count target is present, the workflow execution unit 201 identifies the component of the next process of the set workflow application. Since each process up to steps S136 to S138 is the same as each process up to steps S86 to S88 in FIG. 21B described above, the description thereof is omitted.

In step S139, the workflow execution unit 201 searches the count target management DB 1006 (see FIG. 25) using the component ID as a search key, and further determines whether there is a count target based on the presence or absence of the corresponding count settings.

As described above, according to the present embodiment, instead of the counter component 219 included inside the logic processing unit 144, the count processing unit 20 is implemented outside the logic processing unit 144. Further, instead of the count settings management DB 1004 (see FIG. 11) implemented in the storage unit 1000, a count target management DB 1006 (see FIG. 25) is newly implemented. As a result, instead of the method of setting the count method for each workflow, the count target (setting) is managed for each component. Therefore, for example, the count settings according to the type of the component can be uniformly managed.

The various data tables, types of data definitions, and managed data are examples, and are not limited to the contents exemplified in each embodiment, the usage environment, and the like.

Further, the various tables of the above-described embodiment may be generated by the learning effect of machine learning, and by classifying the data of each associated item by machine learning, the table may not be used. Here, the machine learning is a technology for making a computer acquire learning ability like a human being and the computer autonomously generates an algorithm for determination such as data identification from learning data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more of these learning.

Although the information processing apparatus, the information processing system, the information processing method and the program according to the embodiment of the present invention have been described so far, the present invention is not limited to the above-described embodiment, and other embodiments are added. Changes or deletions, etc. can be made within the range that can be conceived by those skilled in the art, and are included in the scope of the present invention as long as the actions and effects of the present invention are exhibited in any of the embodiments.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising: circuitry configured to:
transmit input screen information for displaying an input screen for receiving input of a workflow including a plurality of components to a communication terminal communicably connected to the information processing apparatus, the plurality of components including a plurality of types of components selected from optical character recognition, portable document format, voice conversion, server message block, and file transfer protocol, the plurality of components combined according to the workflow desired by a user;
set a type of component to be counted from the plurality of components included in the input workflow whose usage history is to be counted according to an operation on the input screen displayed at the communication terminal based on the input screen information;
in response to an execution of each of the plurality of components included in the workflow, determine whether the each of the plurality of components executed is the type of component to be counted;
in a case where the each of the plurality of components executed is the type of component to be counted, count the usage history of the each of the plurality of components so as to manage a count target for the each of the plurality of components;
perform the counting for each type of the plurality of types of the components based on a different count condition set for the each type; and
calculate a usage fee for requesting the user to make a payment corresponding to the counted usage history.

2. The information processing apparatus of claim 1, wherein
the circuitry is further configured to set the count condition based on an operation on a screen displayed in response to an operation on the input screen.

3. The information processing apparatus of claim 1, wherein
the usage history includes the number of executions of the component, and the circuitry is further configured to count the number of executions of the component.

4. The information processing apparatus of claim 3, wherein
the circuitry is further configured to transmit the usage history to an information processing system that performs processing using the usage amount transmitted by the information processing apparatus.

5. The information processing apparatus of claim 4, wherein
the circuitry is further configured to transmit the usage history to the information processing system according to a set time.

6. The information processing apparatus of claim 1, wherein
the usage history includes the usage amount of the component and the circuitry is further configured to count the usage amount of the component.

7. An information processing system comprising:
an information processing apparatus; and
a communication terminal communicably connected to the information processing apparatus,
the information processing apparatus comprising circuitry configured to:
transmit input screen information for displaying an input screen for receiving input of a workflow including a plurality of components to a communication terminal communicably connected to the information processing apparatus, the plurality of components including a plurality of types of components selected from optical character recognition, portable document format, voice conversion, server message block, and file transfer protocol, the plurality of components combined according to the workflow desired by a user;
set a type of component to be counted from the plurality of components included in the input workflow whose usage history is to be counted according to an operation on the input screen displayed at the communication terminal based on the input screen information;
in response to an execution of each of the plurality of components included in the workflow, determine whether the each of the plurality of components executed is the type of component to be counted;
in a case where the each of the plurality of components executed is the type of component to be counted, count the usage history of the each of the plurality of components so as to manage a count target for each of the plurality of components;
perform the counting for each type of the plurality of types of the components based on a different count condition set for the each type; and
calculate a usage fee for requesting the user to make a payment corresponding to the counted usage history,
the communication terminal comprising:
circuitry configured to:
control to display on a display, an input screen for receiving input of a workflow;
receive a placement operation of one or more components displayed on the input screen; and
transmit operation information for setting the workflow based on the placement operation of the one or more components to the information processing apparatus.

8. The information processing system of claim 7, wherein
the circuitry of the communication terminal is further configured to receive input of multiple count conditions for the component.

9. The information processing system of claim 7, wherein
in response to an occurrence of error in the placement operation of the component, the circuitry of the communication terminal is further configured to control to display information indicating that the workflow is not set correctly on the display.

10. An information processing method executed by an information processing apparatus, the method comprising:
transmitting input screen information for displaying an input screen for receiving input of a workflow including a plurality of components to a communication terminal communicably connected to the information processing apparatus, the plurality of components including a plurality of types of components selected from optical character recognition, portable document format, voice conversion, server message block, and file transfer protocol, the plurality of components combined according to the workflow desired by a user;
setting a type of component to be counted from the plurality of components included in the input workflow whose usage history is to be counted according to an operation on the input screen displayed at the communication terminal based on the input screen information;
in response to an execution of each of the plurality of components included in the workflow, determining whether the each of the plurality of components executed is the type of component to be counted;
in a case where the each of the plurality of components executed is the type of component to be counted, counting the usage history of the each of the plurality of components so as to manage a count target for the each of the plurality of components;
performing the counting for each type of the plurality of types of the components based on a different count condition set for the each type; and
calculating a usage fee for requesting the user to make a payment corresponding to the counted usage history.

* * * * *